(12) United States Patent
Hedlund et al.

(10) Patent No.: US 9,932,240 B2
(45) Date of Patent: Apr. 3, 2018

(54) METHOD FOR PRODUCING ZEOLITE CRYSTALS AND/OR ZEOLITE-LIKE CRYSTALS

(71) Applicants: Jonas Hedlund, Luleå (SE); Allan Holmgren, Luleå (SE); Han Zhou, Luleå (SE)

(72) Inventors: Jonas Hedlund, Luleå (SE); Allan Holmgren, Luleå (SE); Han Zhou, Luleå (SE)

( * ) Notice: Subject to any disclaimer, the term of this patent is extended or adjusted under 35 U.S.C. 154(b) by 390 days.

(21) Appl. No.: 14/774,419

(22) PCT Filed: Mar. 14, 2014

(86) PCT No.: PCT/EP2014/055134
§ 371 (c)(1),
(2) Date: Sep. 10, 2015

(87) PCT Pub. No.: WO2014/140296
PCT Pub. Date: Sep. 18, 2014

(65) Prior Publication Data
US 2016/0031715 A1    Feb. 4, 2016

(30) Foreign Application Priority Data
Mar. 14, 2013   (SE) ..................................... 1350311

(51) Int. Cl.
| | | |
|---|---|---|
| C01B 39/40 | (2006.01) | |
| B01J 29/40 | (2006.01) | |
| C01B 39/46 | (2006.01) | |
| C01B 37/02 | (2006.01) | |
| B01D 71/02 | (2006.01) | |
| B01J 20/18 | (2006.01) | |
| B01J 20/30 | (2006.01) | |
| B01J 29/70 | (2006.01) | |
| B01J 35/02 | (2006.01) | |
| B01J 37/04 | (2006.01) | |
| B01J 37/10 | (2006.01) | |
| B01J 39/02 | (2006.01) | |
| B01J 39/14 | (2006.01) | |

(52) U.S. Cl.
CPC ............ *C01B 39/46* (2013.01); *B01D 71/028* (2013.01); *B01J 20/18* (2013.01); *B01J 20/3078* (2013.01); *B01J 29/40* (2013.01); *B01J 29/70* (2013.01); *B01J 35/02* (2013.01); *B01J 37/04* (2013.01); *B01J 37/10* (2013.01); *B01J 39/02* (2013.01); *B01J 39/14* (2013.01); *C01B 37/02* (2013.01); *C01B 39/40* (2013.01)

(58) Field of Classification Search
CPC .. C01B 39/40; C01P 2004/61; C01P 2004/62; B01J 39/40
See application file for complete search history.

(56) References Cited

U.S. PATENT DOCUMENTS

| | | |
|---|---|---|
| 4,061,724 A | 12/1977 | Grose et al. |
| 4,073,865 A | 2/1978 | Flanigen et al. |
| 5,171,556 A | 12/1992 | Caullet et al. |
| 5,672,331 A | 9/1997 | Verduijn |
| 5,863,516 A | 1/1999 | Otterstedt et al. |
| 6,331,500 B1 * | 12/2001 | Tsuji ........................ B01J 20/18 423/701 |
| 2007/0284284 A1 | 12/2007 | Zones et al. |
| 2012/0027673 A1 | 2/2012 | Larsen et al. |
| 2016/0031715 A1 * | 2/2016 | Hedlund ................. C01B 37/02 423/701 |

FOREIGN PATENT DOCUMENTS

| | | |
|---|---|---|
| EP | 1852394 A1 | 11/2007 |
| WO | WO-97/33830 A1 | 9/1997 |
| WO | WO-99/10277 A1 | 3/1999 |

OTHER PUBLICATIONS

Benoit, Louis and Lioubov, Kiwi-Minsker, Synthesis of ZSM-5 zeolite in fluoride media: an innovative approach to tailor both crystal size and acidity, Micropor. Mesopor. Mater. 74 (2004) 171-178.
Bowen, et al., Driving force for pervaporation through zeolite membranes, J. Membrane Sci., 225 (2003) 165-176.
Chang, et al., Rapid Synthesis of Sn-Beta for the isomerization of cellulosic sugars, RSC Advances, (2012) vol. 2, pp. 10475-10477.
Chen, et al., Synthesis and characterization of (h0l) oriented high-silica zeolite beta membrane, Microporous and Mesoporous Materials 124 (2009) 8-14.
Database of Zeolite Structures: http://www.iza-structure.org, last updated Jan. 10, 2002.

(Continued)

*Primary Examiner* — David M Brunsman
(74) *Attorney, Agent, or Firm* — Ballard Spahr LLP

(57) ABSTRACT

The present invention pertains to a method for producing zeolite or zeolite-like crystals using a composition comprising one or more fluorine-containing compounds as a mineralizing agent. Crystals produced by such a method are smaller in size than crystals available in the art and contain few defects. The invention also relates to zeolite and/or zeolite-like crystals obtainable by a method as provided herein as well as crystals defined by any of the structural characteristics provided herein, and the usage thereof such as in the manufacture of thin films and membranes, absorbents, catalysts etc.

11 Claims, 10 Drawing Sheets

(56) References Cited

OTHER PUBLICATIONS

Egeblad, et al., Mesoporous zeolite and zeotype single crystals synthesized in fluoride media, Microporous and Mesoporous Materials 101 (2007) 214-223.

Hedlund, et al., High-flux MFI membranes, Microporous and Mesoporous Materials, 52 (2002) 179-189.

Jones, et al., Organic-functionalized molecular sieves (OFMSs): II. Synthesis, characterization and the transfonnation of OFMSs containing non-polar functional groups into solid acids, Microporous and Mesoporous Materials, 33 (1999) 223-241.

Kalvachec, et al., Seeds-induced fluoride media synthesis of nanosized zeolite Beta crystals, Microporous and Mesoporous Materials 177 (2013) 127-134.

Koller, et al., Five-Coordinate Silicon in High-Silica Zeolites, J. Am. Chem. Soc. 121 (1999) 3368-3376.

Lubomira Tosheva and Valentin P. Valtchev, Nanozeolites:? Synthesis, Crystallization Mechanism, and Applications, Chem. Mater. (2005) 17, 2494-2513.

Mostowicz, et al., Crystallization of silicalite-1 in the presence of fluoride ions, Zeolites 13 (1993) 678-684.

Patarin, et al., Iron distribution in iron MFI-type zeolite samples synthesized in fluoride medium: Influence of the synthesis procedure, Zeolites 10 (1990) 674-679.

Sherman, Synthetic zeolites and other microporous oxide molecular sieves, Proc Natl Acad Sci USA. (2000) May 23; 97(11) (10 pages).

T. Kida et al., Synthesis of large silicalite-1 single crystals from two different silica sources, Ceramics International 30 (2004) 727-732.

Veltri, et al., Thermochimica Acta 420 (2004) 145-154.

Villaescusa, et al., Pure Silica Large Pore Zeolite ITQ-7:? Synthetic Strategies, Structure-Directing Effects, and Control and Nature of Structural Disorder, Chem. Mater., 19 (2007): 1601-1621.

Zhou, et al., Ultrathin hydrophobic MFI membranes, Microporous and Mesoporous Materials, 192 (2014) 76-81.

International Search Report issued by the International Searching Authority dated Jun. 24, 2014 for international application PCT/EP2014/055134, filed on Mar. 14, 2014 and published as WO 2014/140296 on Sep. 18, 2014 (Applicant—Hedlund, et al. // Inventor—Hedlund, et al.) (4 pages).

International Preliminary Report on Patentability issued by the International Searching Authority dated Jun. 8, 2015 for international application PCT/EP2014/055134, filed on Mar. 14, 2014 and published as WO 2014/140296 on Sep. 18, 2014 (Applicant—Hedlund, et al. // Inventor—Hedlund, et al.) (15 pages).

\* cited by examiner

METHOD FOR PRODUCING ZEOLITE CRYSTALS AND/OR ZEOLITE-LIKE CRYSTALS

CROSS-REFERENCE TO RELATED APPLICATIONS

This application is a U.S. National Phase Application of International Application No. PCT/EP2014/055134, filed on Mar. 14, 2014, which claims priority to Swedish Patent Application No. 1350311-5, filed Mar. 14, 2013, each of which are hereby incorporated by reference in their entirety.

TECHNICAL FIELD

The present invention relates to the field of zeolites and zeolite-like crystals commonly used in industry for water purification, for ion exchange, as catalysts and adsorbents, and for the preparation of novel advanced materials such as sensors and membranes. An example of their use as adsorbents is for extraction of nitrogen from air to increase the oxygen content for both industrial and medical purposes. Their major use is as ion exchangers (water softening) in detergents and as catalysts in oil refineries. In addition, they are also used in medicine and in agriculture. Small crystals of zeolites and zeolite-like materials may also be used for the preparation of thin films and membranes and larger crystals with uniform size, with well-defined properties.

BACKGROUND OF THE INVENTION

Zeolites and zeolite-like materials do not comprise an easily definable family of crystalline solids. However, the Structure Commission of the International Zeolite Association has presently approved more than 200 different zeolite framework types and assigned a 3-letter code to each framework. A criterion for distinguishing zeolites and zeolite-like materials from denser tectosilicates is based on the framework density, the number of tetrahedrally coordinated framework atoms per 1000 $Å^3$. The tetrahedrally coordinated framework atoms are also denoted T-atoms. The maximum framework density for zeolites and zeolite-like materials ranges from 19 to over 21 tetrahedrally coordinated framework atoms per 1000 $Å^3$, depending on the type of smallest ring present, whereas the minimum for denser structures ranges from 20 to 22. The Structure Commission maintains a zeolite structure database accessible via the internet [http://www.iza-structure.org/] and is also regularly revising and publishing the Atlas of Zeolite Framework Types. The 6th revised edition of the Atlas was published in 2007 [Ch. Baerlocher, L. B. Mc Cusker, D. H. Olson. Atlas of Zeolite Framework Types, $6^{th}$ Ed., 2007, Elsevier, ISBN 978-0-444-53064-6].

Zeolite frameworks are built from $TO_4$ tetrahedra and the T-atoms are usually silicon and aluminium atoms, but zeolite frameworks can also be prepared from only $SiO_4$ thetrahedra. In the aluminophosphates ($AlPO_4$), the T atoms are aluminium and phosphorous atoms. However, there are many more possibilities and atoms such as Si, Al, P, Ga, Ge, B, Be, Ti, Fe etc. can serve as T-atoms in zeolite frameworks. Zeolites and zeolite-like materials are microporous solids also known as "molecular sieves." The term molecular sieve refers to a particular property of these materials, i.e., the ability to selectively separate molecules based primarily on a size exclusion process. This is due to a very regular pore structure of molecular dimensions. The dimensions of the channels control the maximum size of the molecular or ionic species that can enter the pores of a zeolite. The aperture of the channels are conventionally defined by the ring size, where, for example, the term "8-ring" refers to a closed loop that is built from 8 T-atoms and 8 oxygen atoms.

Zeolites and zeolite like materials have a porous structure that can accommodate a wide variety of cations, such as $Na^+$, $K^+$, $Ca^{2+}$, $Mg^{2+}$ and others. These positive ions can readily be exchanged, which explains why zeolites can serve as ion exchangers.

Natural zeolite minerals are usually formed where volcanic rocks and ash layers react with alkaline groundwater. Naturally occurring zeolites are rarely pure and are contaminated to varying degrees by other minerals, metals, quartz, or other zeolites. For this reason, naturally occurring zeolites are excluded from many important commercial applications where uniformity and purity are essential. Some of the more common zeolites found as minerals in nature are (3-letter codes within brackets) analcime (ANA), chabazite (CHA), clinoptilolite (HEU), heulandite (HEU), natrolite (NAT), phillipsite (PHI), and stilbite (STI).

Zeolites and zeolite like materials can also be prepared synthetically. A frequently prepared zeolite framework is the MFI framework, which has 10 T-atoms in the ring and thereby a suitable pore size for many applications. This framework can be prepared in pure silica form, i.e. the T-atoms are only silicon atoms. In this case, the structure is denoted silicalite-1. However, if some of the silicon atoms are replaced with aluminium atoms, the structure is denoted ZSM-5. Templates or structure directing agents are added to the reaction mixture in the synthesis of zeolites and zeolite like materials to direct the crystallization to the desired framework. For example tetrapropyl ammonium hydroxide is often used as a template in the synthesis of MFI zeolite.

Hydroxide ions are usually employed as a mineralizing agent in the hydrothermal synthesis of these materials. The fluoride route to the synthesis of these materials is based on the substitution of fluoride anions for hydroxide anions implying that fluoride takes charge of the mineralizing role that $OH^-$ has in the conventional synthesis route (the $OH^-$ route).

The source of starting materials employed for preparation of zeolites and zeolite-like materials may be selected from all compounds that are sufficiently reactive to produce the framework structure chemically. Suitable silica sources are for example silicon alkoxides, hydrated silicates, precipitated silica powders, fumed silica and colloidal silica sols. In the hydroxide ion route, the necessary alkalinity is supplied by addition of alkali hydroxides, alkaline earth hydroxides or organic bases or combinations thereof to the aqueous reaction mixture.

The structure directing agents commonly used may also assist in controlling pH of the mixture or pH is adjusted usually by addition of alkali hydroxides. The synthesis pH in hydroxide media is typically about 11 or above whilst it is typically lower in fluoride media (6-11). In the fluoride route of the synthesis, the fluoride anion is suitably supplied to the reaction mixture by any fluorine-containing compound, which ionizes to a sufficient degree in the reaction mixture.

The synthesis of zeolites and zeolite-like materials using fluoride has usually been described with emphasis on the effect of the presence of fluoride on the crystal size, the low amount of defects in the zeolite, the substitution of silicon by trivalent or tetravalent elements and the importance of the organic species leading to a given material. In general, the fluoride route of synthesis has been shown to result in large crystals (typically larger than several micrometers) with a very low degree of connectivity defects.

The first clear example of the use of fluoride in the synthesis of silicalite-1 in slightly alkaline media was disclosed by Flanigen and Patton: U.S. Pat. No. 4,073,865 (1978) describes the preparation of a novel crystalline silica polymorph by a hydrothermal process in which fluoride anions were included in the reaction mixture. The silica polymorph was e.g. prepared from a reaction mixture having a pH of preferably 7.4-10, containing 150 to 1500 moles of $H_2O$, from 13 to 50 moles of $SiO_2$, from 2 to 12 moles of fluoride ions and from 0 to 6 moles of an alkali metal oxide. Each of these reagents were present per 2 moles of a quaternary ammonium cation. The length of the rod-shaped crystals could be as large as 200 micrometers and exhibited higher hydrophobicity than silicalite-1 zeolite synthesized as described in U.S. Pat. No. 4,061,724 (1977), using OH— as mineralizer.

T. Kida et al. (Ceramics International 30 (2004) 727-732) synthesized large silicalite-1 crystals by hydrothermal treatment of a reaction mixture ($SiO_2$-TPABr—$NH_4F$—$H_2O$) at 150-200° C. Large crystals up to 1800 micrometer were obtained.

Benoit Louis and Lioubov Kiwi-Minsker (Micropor. Mesopor. Mater. 74 (2004) 171-178) prepared ZSM-5 zeolites at neutral pH by fluoride-mediated synthesis. By varying the F/Si ratio from 0.3 to 1.6, the size of the zeolite crystals could be tailored between 10 and 75 micrometers.

R. Mostowicz et al. (Zeolites 13 (1993) 678-684) used a variable HF/NaF ratio to synthesize zeolite of MFI structure and obtained regularly sized crystals with a length between 80 and 120 micrometers.

J. Patarin et al. (Zeolites 10 (1990) 674-679) synthesized MFI-type ferrisilicate zeolite (the mole ratio of Si/Fe varied from 28 to 10,000) in the presence of fluoride ions by using different silicon and iron sources. Iron was homogeneously distributed in the crystals and the crystal size varied from 50 to 80 micrometers.

M. Veltri et al. (Micropor. Mesopor. Mater. 420 (2004) 145-154) synthesized V-MFI zeolite crystals by hydrothermal treatment of a reaction mixture ($Na_2O$—$VO_2$—NaF—$SO_3$—$SiO_2$-TPABr—$H_2O$) at 190° C. The size of the synthesized crystals varied from 11.5 to 33.5 micrometers.

In the art, the replacement of the hydroxide anions by fluoride anions as mineralizing agent is known to facilitate the synthesis of large zeolite crystals.

Methods for the preparation of small zeolite crystals have been disclosed in the patent literature. The first example was disclosed by Sterte: U.S. Pat. No. 5,863,516 (A) describes the preparation of colloidal zeolite suspensions using hydroxide as the mineralizing agent.

There are numerous publications in the scientific literature describing the preparation of colloidal zeolite crystals using hydroxide as mineralizing agent. A review has been published by Tosheva and Valtchev [Nanozeolites: Synthesis, Crystallization Mechanism, and Applications, Lubomira Tosheva and Valentin P. Valtchev*. Chem. Mater. 2005, 17, 2494-2513]. It is known in the art that high supersaturation and steric stabilization of the nuclei in the reaction mixture are key factors for the formation of nonaggregated zeolite nanocrystals. These conditions are usually achieved when the concentration of the organic structure directing agent is high and the concentration of alkali cations is very low in the reaction mixture. Under these conditions, the negatively charged subcolloidal particles are not aggregated in the reaction mixture. Furthermore, hydrothermal treatment at relatively low temperature is necessary to obtain small zeolite crystals [Nanozeolites: Synthesis, Crystallization Mechanism, and Applications, Lubomira Tosheva and Valentin P. Valtchev*. Chem. Mater. 2005, 17, 2494-2513].

There is still a need in the art to identify methods for producing small zeolite and/or zeolite-like crystals with a low amount of defects. Such crystals are particularly useful for producing thin films and membranes as well as in the manufacture of catalysts and adsorbents. Small zeolite and/or zeolite-like crystals with a low amount of defects may also be used directly as catalysts and adsorbents. Further, it is also a need in the art to identify a method, which produces membranes that have fewer defects, are hydrophobic and thereby better adapted for separating non-polar components from polar components.

SUMMARY OF THE INVENTION

The problems associated with the prior art have now been overcome, or at least mitigated, as shown herein by providing a method for producing zeolite and/or zeolite-like crystals with a low amount of defects, wherein the crystals which are obtained through such a method may be equal to or less than 1.5 μm such as equal to or less than 1000, 500, 400, 300, 200, 100 or 50 nm in length, as measured by Scanning electron microscopy (SEM).

Accordingly, there is provided a method for producing zeolite and/or zeolite rystals. The method comprises the steps of:
a) mixing i) one or more starting material(s) for preparing zeolites and/or zeolite-like crystals, ii) a structure-directing agent and iii) water, thereby providing a mixture comprising i) one or more hydrolyzed starting material(s) for preparing zeolites and/or zeolite-like crystals, ii) a structure-directing agent and iii) water and iv) one or more solubility-reducing component(s).
b) removing said solubility-reducing component(s) formed in step a) so that the mixture contains 10 wt % or less of said solubility-reducing component(s),
d) adding a fluorine containing compound to the mixture,
e) forming zeolite and/or zeolite-like crystals from the mixture,
f) collecting the zeolite and/or zeolite crystals from step e).

There is also provided herein zeolite and/or zeolite-like crystals obtainable by a method as presented herein, as well as zeolite and/or zeolite-like crystals comprising one or more fluorine-containing compound(s), wherein said crystal may have a length of equal to or less than 1.5 μm such as equal to or less than 1000, 500, 400, 300, 200, 100 or 50 nm, and/or as described by any of the characterizing structural features provided herein. Also provided herein is an object, such as a film, catalyst, ion exchanger, adsorbent, film, sensor and membrane comprising zeolite and/or zeolite-like crystals or grown from zeolite and/or zeolite-like crystals as disclosed herein. It is further provided a method for preparing a monolayer and/or a multilayer structure comprising zeolite and/or zeolite-like crystals produced by a method as disclosed herein as well as a method for preparing a structure, such as a film, comprising zeolite and/or zeolite-like crystals.

Accordingly, by adding one or more fluorine containing compound(s) while removing substantially all or most of any solubility-reducing components formed during the execution of the method, crystals with a low amount of defects may be produced, which are smaller and which provides for excellent direct use for example as catalysts and adsorbents and in the manufacture of catalysts and adsorbents containing such crystals, as well as films, membranes, and sensors possessing molecular sieve characteristics.

Surprisingly, the removal of substantially all or most of any solubility reducing agent(s) as described herein, such as ethanol, resulted in synthesizing small zeolite crystals by the fluoride route as described herein.

The removal of ethanol from reaction mixture has been described in Kresten Egeblad et al., Microporous and Mesoporous Materials 101 (2007) 214-223; Yanli Chen et al., Microporous and Mesoporous Materials 124 (2009) 8-14.

However, vigorously stirring the reaction mixture for 6 h at room temperature is not enough to remove substantially all or most of the ethanol and does not provide small crystals having a length equal to or less than 1.5 µm as described herein.

DEFINITIONS

A "zeolite and/or zeolite-like crystal" as prepared and referred to herein, may be a crystal of any of the framework types approved by the Structure Commission of the International Zeolite Association (http://www.iza-structure.org/). Such zeolites have the characteristics of large internal pore volume, molecular-size pores, regularity of crystal structure, and a diverse framework chemical composition making them highly active and selective catalysts, adsorbents, ion exchangers, and molecular sieves [J. D. Sherman. Proc Natl Acad Sci USA. 2000 May 23; 97(11); 6236]. The term crystal as referred to herein also refers to all synthetic crystals of zeolites and zeolite-like materials of any the framework types approved by the Structure Commission of the International Zeolite Association (http://www.iza-structure.org/). Zeolite and/or zeolite-like crystals which may be produced by a method as disclosed herein include but are not limited to those of framework types AFI, AEL, BEA, CHA, EUO, FAU, FER, KFI, LTA, LTL, MAZ, MOR, MEL, MTN, MTT, MTW, OFF, TON, and especially MFI zeolites. Further examples falling within the above frameworks include silicalite, silicalite-1, TS-1, ZSM-5, and the zeolites sodalite, A, Beta, L, Y, X, ZSM-22, ZSM-11, ZSM-2, and SAPO-34. Some of the above materials, while not being true zeolites are frequently referred to in the literature as such, and the term zeolite will herein be used broadly to include such materials. Further, whenever a crystal, the crystals or the like is referred to herein, this is of course intended to refer also to a plurality of crystals of a framework type as defined herein.

A "starting material" as referred to herein is a material which is appropriate to use for producing zeolite and/or zeolite-like crystals in a method as presented herein. An example of a starting material is a source of silicon/silica and/or a source of aluminium/alumina of which more specific examples of are also provided herein.

Whenever "crystal length" is referred to herein, this is intended to refer to the length of a crystal in its longest direction.

The terms "reaction mixture" or "synthesis solution", or the like, as used herein are broad terms, and are to be given their ordinary and customary meaning to a person of ordinary skill in the art and refer without limitation to a composition which comprises one or more starting material (s) for preparing zeolites and/or zeolite-like crystals, and a structure-directing agent. It may also comprise additional ingredients, such as water.

A "solubility-reducing component", as defined herein, refers to a component, which in some manner or amount affects the solubility of a solution or medium, i.e. which reduces the solubility of the starting materials, or any product formed therefrom, as presented herein. Such a component may be an alcohol, such as ethanol or propanol, but is not limited thereto. In the present context, most of any such component(s) is to be removed from the aqueous reaction mixture formed in the method, to allow for the production of small crystals in a method as provided herein. Still, even though it is preferred if most of the solubility-reducing components are removed there may still be some amounts present in the solutions formed. In this context, this may be referred to as removing "substantially all" or "most of" any solubility reducing component formed. An example of how this may be achieved is illustrated in the experimental section. When substantially all, or most of, any solubility reducing components have been removed, this may refer to when about 0-10 wt %, such as about 1-5 or 5-10 wt %, such as about 1, 2, 3, 4, 5, 6, 7, 8, 9 or 10% of solubility reducing components, e.g. ethanol, is still remaining in a reaction mixture in a method as presented herein.

A "structure-directing agent" as referred to herein, also in the art referred to as a "template" or a "template agent", is a broad term, and is to be given its ordinary and customary meaning to a person of ordinary skill in the art, and refers without limitation to an organic or inorganic structure directing agent resulting in crystallisation of zeolite and/or zeolite-like crystals. This means an agent, which directs the formation of a crystal with a particular framework structure. Accordingly, the effect of a structure directing agent is that in the production of the crystalline framework the agent serves like a template around which the crystalline framework grows, or which causes the crystallisation to be directed to form a particular crystalline framework. Examples of structure-directing agents as well as zeolite frameworks are provided herein.

A "mineralizing agent", as referred to herein, refers to a compound that aids in the mineralization, i.e. the dissolution and/or hydrolysis of starting materials and formation of crystals from a solution of starting materials.

An "all-silica zeolite crystal", as referred to herein, refers to a crystal which has a framework structure of a zeolite crystal as disclosed, wherein only Si serves as T-atoms in the zeolite framework.

A "colloidal crystal" as referred to herein, may be defined as a particle having at least one dimension within the nanometer to micrometer range. Particles in a colloidal dispersion are sufficiently large for definite surfaces of separation to exist between the particles and the dispersion medium. A colloidal crystal described herein may be characterized with respect to for example framework structure, specific surface area, length, thickness, particle size, particle size distribution, and distribution of the pore volume versus pore diameter.

The term "monolayer" in the present context refers to a layer having a thickness substantially corresponding to the thickness of one crystal, said layer comprising discrete crystals which are deposited on a substrate. The crystals and other materials if present may be closely packed to provide a classical monolayer or just a layer, since films can be grown from multilayers or sub-multilayers. Alternatively the crystals and other materials if present are not closely packed and therefore are present as a sub-monolayer. The exact packing density required depends to a certain degree on the nature of the crystals and the desired film to be grown from these crystals. The packing density of crystals in the monolayer should in any event be such as to enable a thin layer of a zeolite film to be grown and intergrown from the crystals.

In this document, the term "mm" stands for millimetre and the term "nm" stands for nanometer. Further, "µm" stands for micrometer.

It should be noted that all examples mentioned herein of materials, concentrations and any ranges or the like are applicable to all aspects of the invention even if not specifically mentioned.

DESCRIPTION

Figure 1:
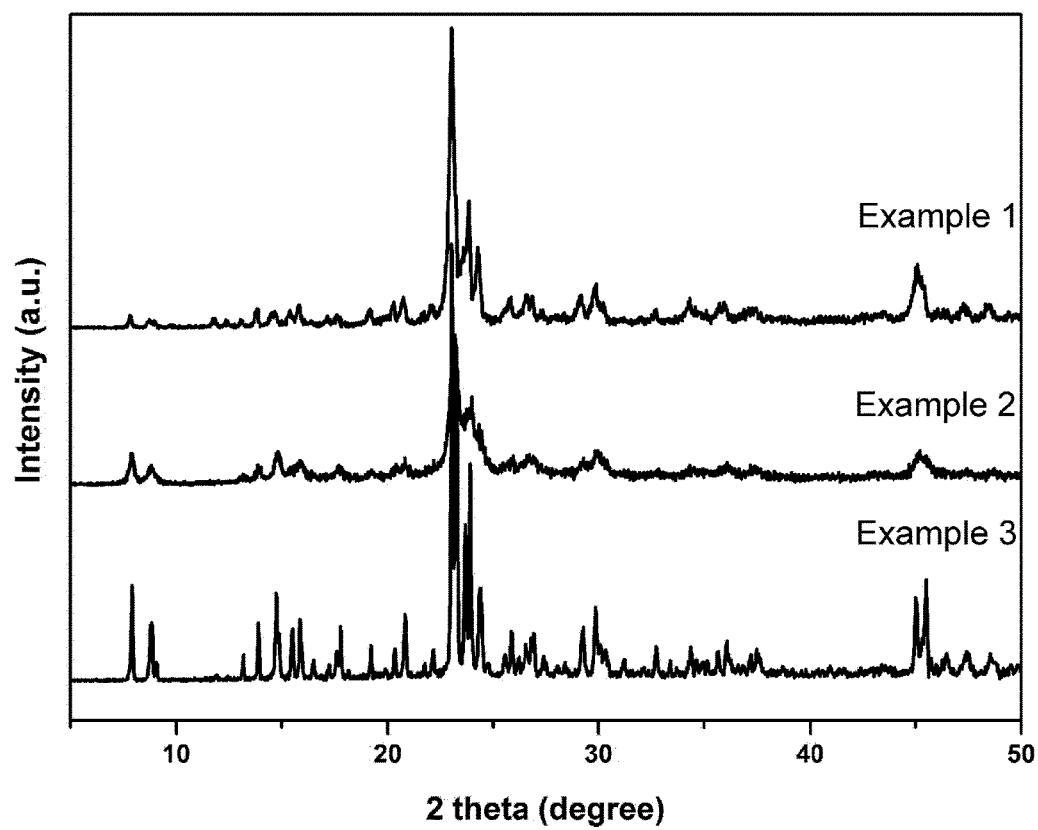
FIG. 1. XRD patterns of the silicalite-1 crystals synthesized according to the procedure described in Examples 1-3.

The present invention relates to a method for synthesizing or producing crystals with a low amount of defects, wherein said crystals produced through such a method are smaller in size than crystals produced by conventional methods. From crystals produced by a method provided herein it is possible to produce thin films, sensors and membranes, adsorbents and catalysts with fewer defects. Such membranes can then be used for producing various products as disclosed herein. Hence, there is provided herein colloidal dispersions of crystals produced using a composition comprising fluoride as mineralizing agent. Said crystals are synthesized as discrete entities which may be equal to or less than about 1.5 µm such as equal to or less than about 1000, 500, 400, 300, 200, 100 or 50 nm in length.

Accordingly, there is provided a method for producing zeolite and/or zeolite crystals. The method comprises the steps of:
a) mixing i) one or more starting material(s) for preparing zeolites and/or zeolite-like crystals, ii) a structure-directing agent and iii) water, thereby providing a mixture comprising i) one or more hydrolyzed starting material(s) for preparing zeolites and/or zeolite-like crystals, ii) a structure-directing agent and iii) water and iv) one or more solubility-reducing component(s).
b) removing said solubility-reducing component(s) formed in step a) so that the mixture contains 10 wt % or less of said solubility-reducing component(s),
d) adding a fluorine containing compound to the mixture,
e) forming zeolite and/or zeolite-like crystals from the mixture,
f) collecting the zeolite and/or zeolite crystals from step e).

The method may further comprise a step c) prior to step d) and following step b): c) addition of one or more aqueous solvent(s).

Further, said fluorine compound may be added in step a), b) and/or c) in the method described herein.

It is observed by Scanning electron microscopy (SEM) that crystals may be provided by a method herein which are small discrete crystals which may be equal to or less than about 1.5 µm such as equal to or less than about 1000, 500, 400, 300, 200, 100 or 50 nm in length in contrast to the large crystals known in the art which are generally obtained using fluoride as mineralizing agent. Accordingly, the crystals as prepared herein are much smaller than crystals synthesized in the presence of fluoride ions as described in the prior art.

It is known in the art of crystallization utilizing the fluoride route that a reduced pH compared to conventional synthesis not only results in a reduced amount of defects, but also results in enhanced crystal sizes. Hence, this is in sharp contrast to the method disclosed herein, by which surprisingly small and substantially defect free crystals are formed using a composition comprising one or more fluorine-containing compounds as a mineralizing agent.

Furthermore, the crystals prepared herein contain much less structural defects and have much lower micro pore volume than the corresponding crystals synthesized by the frequently used route using hydroxide as mineralizing agent. This is shown by supporting information from nuclear magnetic resonance spectroscopy and nitrogen adsorption data, respectively.

The sols or colloids of zeolites and/or zeolite-like crystals may be prepared so as to contain essentially no amorphous silica. Such sols may be dried to a powder and exhibits properties different from zeolite suspensions prepared the conventional way using a composition comprising a fluorine-containing compound as a mineralizing agent. Such crystals may be deposited on suitable substrates in order to grow films and membranes. The films which possess molecular sieve characteristics may also be used as sensors. The crystals prepared by a method provided herein are also suitable as adsorbents and catalysts or for the preparation of adsorbents and catalysts. The use of crystals in the nano-size range produced as shown herein also allows for an efficient separation of polar and non-polar species by for instance an adsorption or a membrane process.

Accordingly, a method of synthesizing, producing and/or growing small zeolite and/or zeolite-like crystals in the presence of fluoride ions is disclosed. An example of such a crystal is crystals of silicalite-1, which is further illustrated in the examples. When preparing a zeolite and/or zeolite-like framework comprising silica, a silicate solution may be prepared from a monomeric silica source, such as a silicon alkoxide.

Further, crystals as produced by the method herein may be comprised of any of the zeolites and zeolite-like materials with a framework type approved by the Structure Commission of the International Zeolite Association. Illustrative examples of framework types comprise AFI, AEL, BEA, CHA, EUO, FAU, FER, KFI, LTA, LTL, MAZ, MOR, MEL, MTN, MTT, MTW, OFF, TON, and especially MFI zeolites. Further examples are VFI type materials, AET type, AFO type, AFR type, AFS type, AFY type, ASV type, ATO type, ATS type, BEA type, BEC type, BOG type, BPH type, CAN type CFI type, -CLO type, CON type, DON type, DFO type, EMT type, EON type, ETR type, EUO type, EZT type, FAU type, FER type, GME type, GON type, IFR type, IMF type, ISV type, IWR type, IWV type, IWW type, LTA type, LTL type, MAZ type, MEI type, MEL type, MFI type, MFS type, MOR type, MOZ type, MSE type, MTT type, MTW type, MWW type, OFF type, OSI type, OSO type, PON type, RRO type, RWY type, SAO type, SBE type, SBS type, SBT type, SFE type, SFF type, SFG type, SFH type, SFN type, SFO type, SOS type, SSY type, STF type, SZR type, TER type, TON type, TUN type, USI type, UTL type, or VET type.

Further examples are hydroxysodalite, TS-1 as well as the zeolites A, Beta, L, X, Y, ZSM-2, ZSM-11, ZSM-22, ZSM-5, and SAPO-34.

A reaction mixture or mixture as provided herein may comprise a silicon source and/or an alkali source of inorganic or organic nature, a structure-directing agent and optionally hetero-elements such as Al, Ga, Ti, Fe, V, Co, Ge, P, or a mixture thereof in addition to water and fluorine containing compounds and a source of acidity or a source of alkali. In this document, "reaction mixture" and "mixture" are used interchangeably.

Further, a reaction mixture may comprise an aluminum and/or phosphorus source, and/or a source of acidity, a structure-directing agent and optionally hetero-elements such as Si, Ga, Ti, Fe, V, Co, Ge, B or a mixture thereof. As an example for the SAPO-5 zeolite type material (also referred to as AFI type), aluminum-isopropoxide may be used as an aluminum source, phosphoric acid as a phosphorus source, tripropylamine as template, and Aerosil200 (Degussa) as a silica source.

Further, a source of acidity for use herein may e.g. be phosphoric acid and a source of alkali may e.g. be tetrapropylammoniumhydroxide.

By removing most of, or all of the formed solubility reducing component(s) or compound(s) such as alcohol from the solution, it was possible to synthesize colloidal zeolite crystals using a composition containing a fluorine containing compound as a mineralizing agent. The colloidal dispersions display Tyndal light scattering typical for colloidal dispersions and may have an average particle length equal to or less than about 1.5 μm such as equal to or less than about 1000, 500, 400, 300, 200, 100 or 50 nm in length as measured by scanning electron microscopy.

After thorough mixing, the reaction mixture so formed becomes a clear synthesis solution. In this part of the synthesis procedure, an example of a useful silica source is tetraethyl orthosilicate, an example of a useful aluminium source is aluminum isopropoxide, and an example of an structure-directing agent, which also functions as an alkali source, is tetrapropylammonium hydroxide which implies that ethanol and isopropanol are formed after the hydrolysis reaction. It should however be emphasized that these reactants are not the only ones suitable for a method as provided herein.

Thereafter, most of or all alcohols or any other components reducing the solubility of the starting materials, or any product(s) formed therefrom, also referred to as solubility-reducing components, are removed from the reaction mixture so formed for example by using a rotary evaporator. During this removal, the mixture usually transforms into a thick clear gel or a solid since the concentration of starting materials becomes very high because most of the solubility reducing compounds, and in addition some water, was removed. Removing most or substantially all of any solubility-reducing components in this step is particularly suitable for obtaining crystals, which are smaller in size than previously possible, e.g. crystals which may be equal to or less than about 1.5 μm such as equal to or less than about 1000, 500, 400, 300, 200, 100 or 50 nm in length. When most of any solubility-reducing components are removed, this is intended to refer to that most, or substantially all of any solubility-reducing components are removed from a reaction solution, but it should be noted that small amounts may still be present, but which will not significantly affect the outcome of the method. This is also referred to as removing substantially all or most of any solubility-reducing component(s). Preferably, 10 wt % or less of solubility reducing component(s) remain after removal.

A further step in the method for producing zeolite and/or zeolite-like crystals utilizing a composition comprising a fluorine-containing compound as a mineralizing agent may comprise providing the reaction mixture with additional components. Only component(s) that is/are not reducing the solubility of the starting materials is/are added in this step. Component(s) added in this step may e.g. be additional water and/or fluoride ions. However, fluoride and water may be added to any of the said reaction mixture(s).

The fluoride anions are suitably supplied to the reaction mixture by any fluorine-containing compound which ionizes to a sufficient degree in the reaction mixture.

Tetrapropylammoniumflloride, ammonium fluoride, potassium fluoride, sodium fluoride or any other fluoride salt are examples of fluorine-containing compounds which may be used in a method as provided herein, exemplified by hydrogen fluoride which lower the pH of the reaction mixture if an aqueous alkaline solution is used for hydrolysis of the starting materials.

The starting materials as referred to herein may be selected from all compounds which are sufficiently reactive to produce the framework structure of the zeolite or zeolite like crystals. Examples of suitable silicon sources are for example silicon alkoxides, hydrated silicates, precipitated silica powders, fumed silica, and colloidal silica sols. Suitable aluminum sources are aluminium alkoxides, such as aluminium isopropoxide, aluminium metal, and aluminates. Further examples of starting materials are monomeric forms of silicon such as tetraethyl orthosilicate and monomeric forms of aluminium such as aluminium isopropoxide.

Accordingly, an example of said starting material(s) of step a) comprises one or more silicon source(s) and/or one or more aluminium source(s), and/or one or more source(s) comprising silicon and aluminium, such as aluminium silicates. An example of a source of silicon comprises a monomeric form of silicon. Said source of silicon may also comprise silica. As a further example, said silicon may be a silicon alkoxide, such as a tetraalkoxysilane, such as tetraethoxysilane. To promote formation of small crystals, the concentration of starting materials in the solution is high. As an example, when a framework mostly comprised of silica is to be prepared, i.e. when the starting material comprises a source of silicon, the silica ($SiO_2$)/water ratio in the reaction mixture may be >1%, such as about 1-10%, such as 5, 6, 7, 8, 9 or 10%, on a molar basis. Herein, this refers to the molar ($SiO_2$)/water ratio in a reaction mixture before the formation of the crystals, i.e. before entering step e) of a method as provided herein.

An example of a source of aluminium comprises an aluminium alkoxide, such as aluminium isopropoxide.

The starting materials may be of high purity and may preferably be hydrolyzed and/or dissolved by mixing with structure directing agents in hydroxyl form in the reaction mixture in step a). In this way, it is not necessary to add any additional hydroxides of alkali metals to dissolve the starting materials completely and the concentration of alkali metal cations may be kept low in the reaction mixture, which promotes formation of discrete, nonaggregated crystals as a product. As an example, the alkali metal cation/water ratio in the reaction mixture, may be <0.5% on a molar basis, such as close to 0%. Herein, this refers to the ratio of the molar alkali metal cation/water ratio in the reaction mixture before the formation of the crystals, i.e. before entering step e) of a method as provided herein.

A crystal produced by a method as disclosed herein may be an all-silica zeolite crystal. A crystal produced by a method as disclosed herein may also be a MFI phase zeolite crystal, such as an MFI phase all-silica zeolite. Crystals produced or obtainable by a method as provided herein may be colloidal crystals.

In the present context, the pH of the reaction mixture to which a composition comprising one or more fluorine containing compound(s) has been added, may be adjusted to about pH 5-10, such as about pH 6-8, e.g. about pH 6.2, pH 6.3, pH 6.4, pH 6.5, pH 7 or pH 7.5.

Further, as an example, a reaction mixture as mentioned herein comprises water, deuterium oxide ($D_2O$) or a combination thereof.

Step e) of the method described herein may take place using hydrothermal treatment. As an example, said zeolite and/or zeolite-like crystals may be formed by hydrothermal treatment under crystallization conditions. A hydrothermal treatment may be described as a procedure where a reaction mixture containing all the necessary starting materials and any structure-directing agent needed for formation of the crystals is heated for a certain time during which crystallization occurs. As shown herein, for obtaining crystals, the clear gel may subsequently be exposed to hydrothermal treatment in for instance a polypropylene bottle until the said crystals are formed, which may require about 2 months at 60° C. However, temperatures below 150° C. will be suitable, e.g. at about 25° C. to 150° C., such as below 100° C., such as between 30° C. to 100° C. or between 50° C. and 70° C., e.g. at about 60° C. Said crystals so obtained may be purified by centrifugation and/or redispersion in one or more aqueous dispersants, such as water and if a powdered form of the colloidal dispersion is required, the dispersion may be dried by methods known in the art, such as for example by freeze-drying.

A solubility-reducing component as mentioned herein may be one or more non aqueous solvent(s), such as one or more alcohol(s), such as ethanol and/or isopropanol. Most of such solubility-reducing components are to be removed from said first solution that is formed, as further described herein. Removal of any solubility-reducing components may e.g. be performed by evaporation, distillation or adsorption. Evaporation and distillation may be performed at elevated temperature and/or under reduced pressure or preferably by a combination thereof. As an example, most of the solubility-reducing components, such as ethanol, in an aqueous synthesis mixture may be removed by evaporation by carrying out the evaporation process until the weight loss of the synthesis mixture is about two times larger than the weight of the solubility-reducing components, such as ethanol, originally present in the synthesis mixture. After completion of the evaporation process, water may be added to the synthesis mixture in an amount corresponding to the evaporated amount of water during the evaporation. The evaporation processes is preferably carried out at low temperature, such as less than 50° C. and under reduced pressure for about 1 h in total. Alternatively, an adsorbent is used to remove solubility reducing compounds from the synthesis mixture. A suitable adsorbent is large silicalite-1 crystals prepared using fluoride as mineralizing agent. Such crystals selectively adsorb alcohols such as ethanol from water solutions. After the adsorption process, the crystals may be removed from the synthesis mixture by filtering. Alternatively, most of the solubility reducing compounds may be removed by distillation, preferably at low temperature under reduced pressure as exemplified for the evaporation process. By using distillation, the solubility reducing compounds may be removed more selectively and more completely from the aqueous synthesis mixture, thereby minimizing the loss of water as compared to the evaporation process.

Structure directing agents, as referred to herein, are typically organic amines, such as alkylamines and in particular, tetraalkylamines such as tetraalkylammonium hydroxide. An example of a tetraalkylammonium hydroxide is tetrapropylammonium (TPA) hydroxide. Other examples include tetraalkylammonium bromide and/or tetraalkylammonium fluoride. It is convenient to use tetraalkylammonium hydroxide to provide the alkali needed to hydrolyze the raw materials in solution a). Further examples of structure directing agents include the hydroxide or salt of tetramethylammonium (TMA), tetraethylammonium (TEA), triethylmethylammonium (TEMA), tetrabutylammonium (TBA), tetrabutylphosphonium (TBP), trimethylbenzylammonium (TMEA), trimethylcetylammonium (TMCA), trimethyineopentylammonium, (TMNA), triphenylbenzylphosphonium, (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane or 1,6-diaminohexane. Other examples are tripropylamine, triethylamine, triethyl-n-propylammonium hydroxide, 2-picoline, 3-picoline, 4-picoline, piperidine, N-methyldiethanolamine, and the like.

The concentration of a structure directing agent in the reaction mixture is generally high. For example, when a structure directing agent in the form of tetrapropylammonium ions is used, the tetrapropylammonium/water ratio may be >0.5%, such as about 1-10%, such as 3%, on a molar basis. Herein, this refers to the molar tetrapropylammonium/water ratio in the reaction mixture before the formation of the crystals, i.e. before entering step d) in a method as described herein.

A fluorine-containing compound as mentioned herein may be selected from any compound that ionizes to a sufficient degree in the solution. The fluorine-containing compound is a compound which comprises fluorine in any suitable form, such as a liquid, gas, and/or solid form. Such a compound may of course also contain other entities which are not fluorine, as exemplified herein. Examples of suitable fluorine-containing compounds are alkylammonium fluoride, tetraalkylammonium fluoride, ammonium fluoride, potassium fluoride, sodium fluoride, and/or hydrofluoric acid, and/or a combination thereof. The fluoride/water ratio in the reaction mixture is generally >0.5%, preferably in the range of about 1-5%, such as about 1, 2, 3, 4, or 5%, on a molar basis. Herein, this refers to the molar fluorine containing compound/water ratio in the reaction mixture before the formation of the crystals, i.e. before entering step e) in a method as provided herein. Examples of suitable fluoride/water molar ratios include 5/300=1.7%, 7/300=2.3% and 9/300=3%.

Further, as an example, step f) may comprise purification by centrifugation and redispersion in one or more dispersant(s), such as an aqueous dispersant. The solid crystalline phase obtained after centrifugation may be dispersed in for example water and then centrifuged again to remove any remaining soluble amorphous material. If a powdered form of the colloidal crystals is required, a purified colloidal dispersion of crystals can be freeze dried by methods known in the art. A suitable centrifugation procedure to recover the crystals is centrifugation at about 50 000 g or more for at least 4 hours at 25° C.

A crystal as provided herein and as produced by a method disclosed herein may be equal to or less than about 1.5 µm such as equal to or less than about 1000, 500, 400, 300, 200, 100 or 50 nm in length. Further, there is also provided herein, a zeolite and/or zeolite-like crystal comprising one or more fluoride containing compound(s), wherein said crystal may be equal to or less than 1000, 500, 400, 300, 200, 100 or 50 nm in length.

Figure 6:
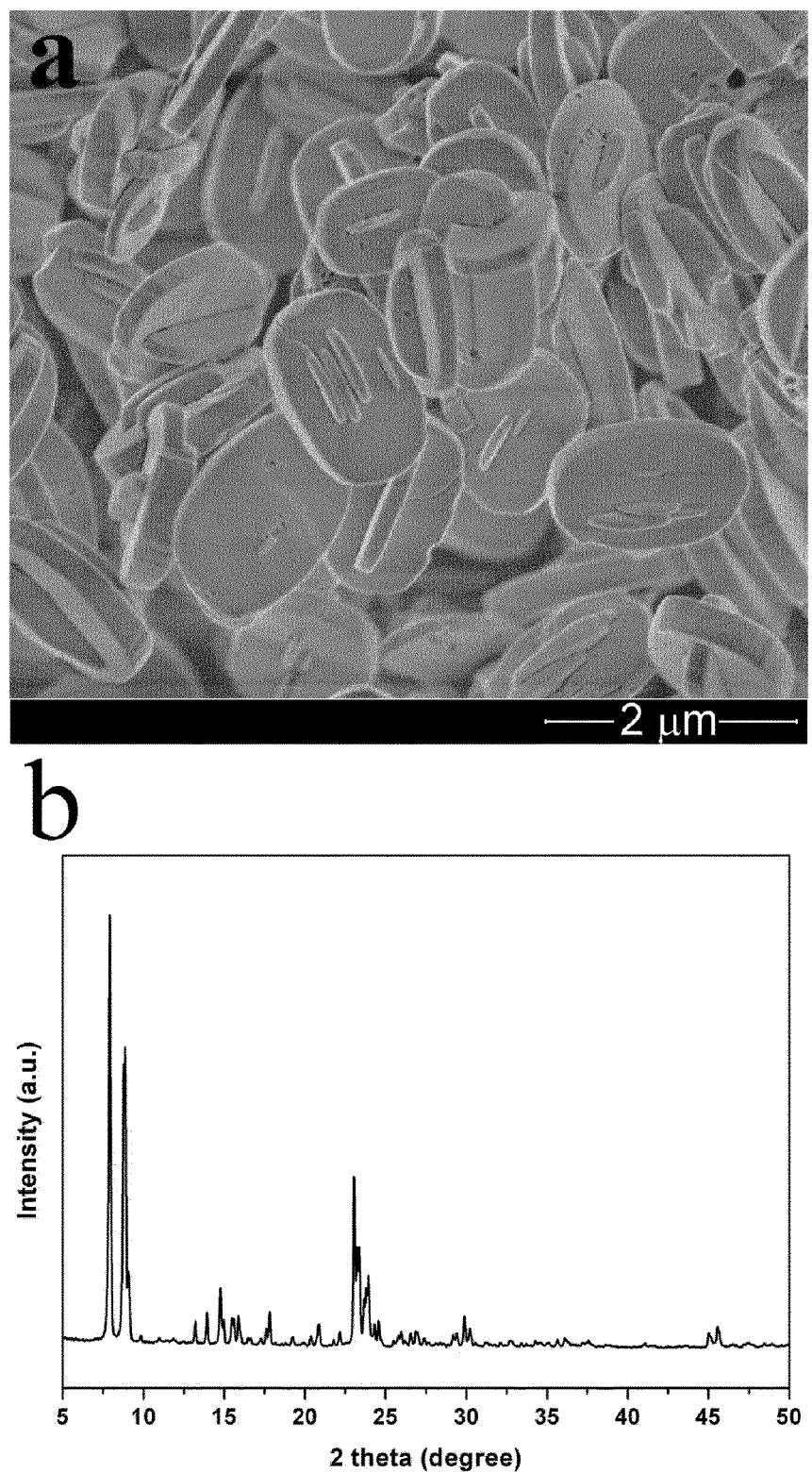
FIG. 6. SEM image (a) and XRD pattern (b) of the silicalite-1 crystals described in Example 11.
Figure 7:
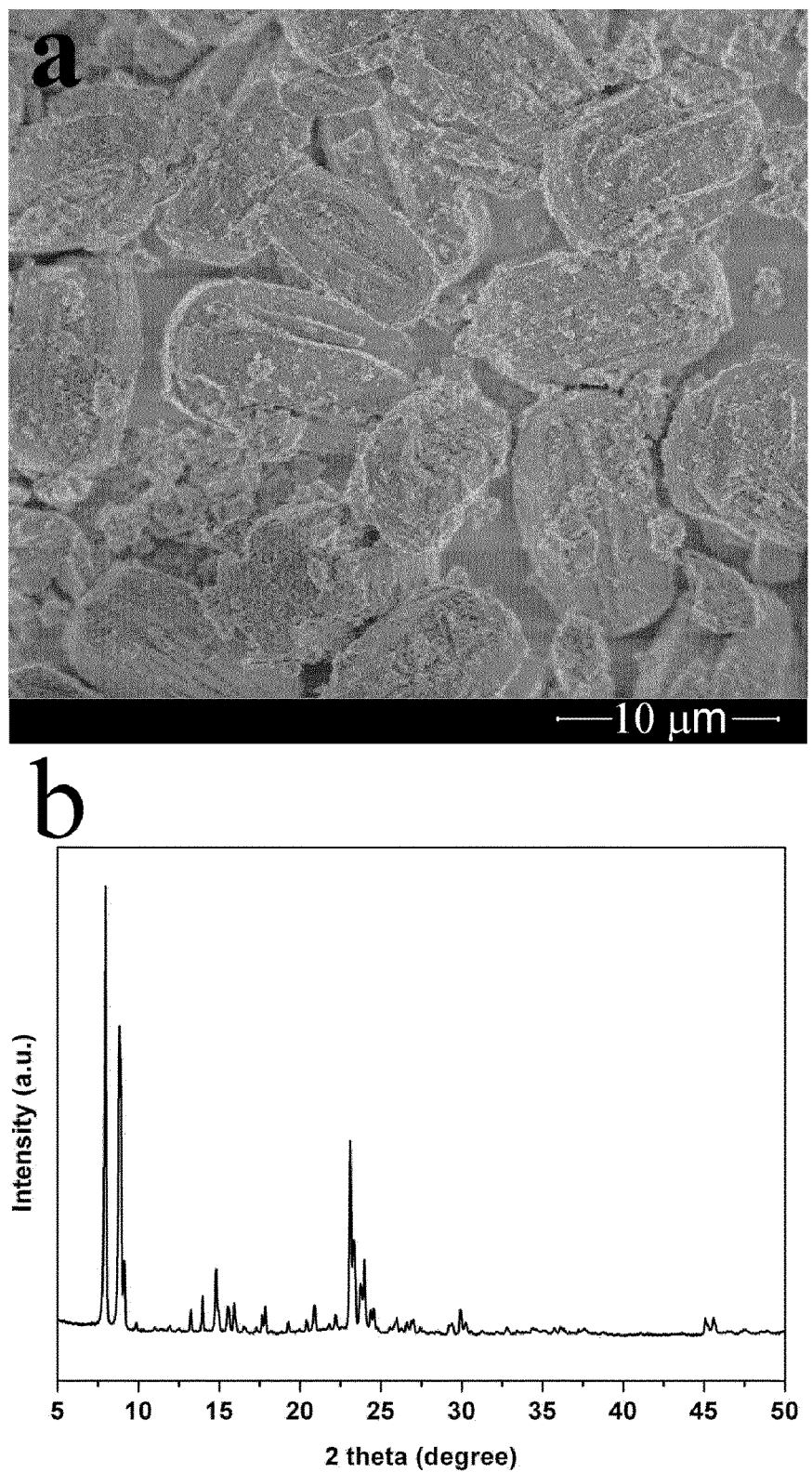
FIG. 7. SEM image (a) and XRD pattern (b) of the silicalite-1 crystals described in Example 12.

There is also provided herein, a crystal which is obtainable by a method as provided herein. There is also provided herein, a crystal, wherein said crystal is characterized by exhibiting an X-ray diffraction pattern characteristic of a framework structure of zeolites and/or zeolite like materials, for instance as the XRD patterns illustrated in FIG. 1, 6(b) or 7(b), which are characteristic for the MFI framework when the pattern is recorded in Bragg Brentano geometry using CuK$_\alpha$ X-rays. Said crystal is produced by a method as disclosed herein, meaning that said crystal may be equal to or less than about 1.5 µm such as equal to or less than about 1000, 500, 400, 300, 200, 100 or 50 nm in length.

There is also provided herein, a crystal characterized in providing one or more narrow $Q^{(4)}$ resonance line(s) emanating from any crystallographically different Si-atoms in the framework in the $^{29}$Si MAS-NMR spectrum. Said crystal is produced by a method as disclosed herein, meaning that said crystal may be equal to or less than about 1.5 µm such as equal to or less than about 1000, 500, 400, 300, 200, 100 or 50 nm in length. There is also provided herein a zeolite and/or zeolite-like crystal, characterized in providing one or several narrow Q(4) resonance line(s) emanating from the crystallographically different Si-atoms in the framework.

Figure 4:
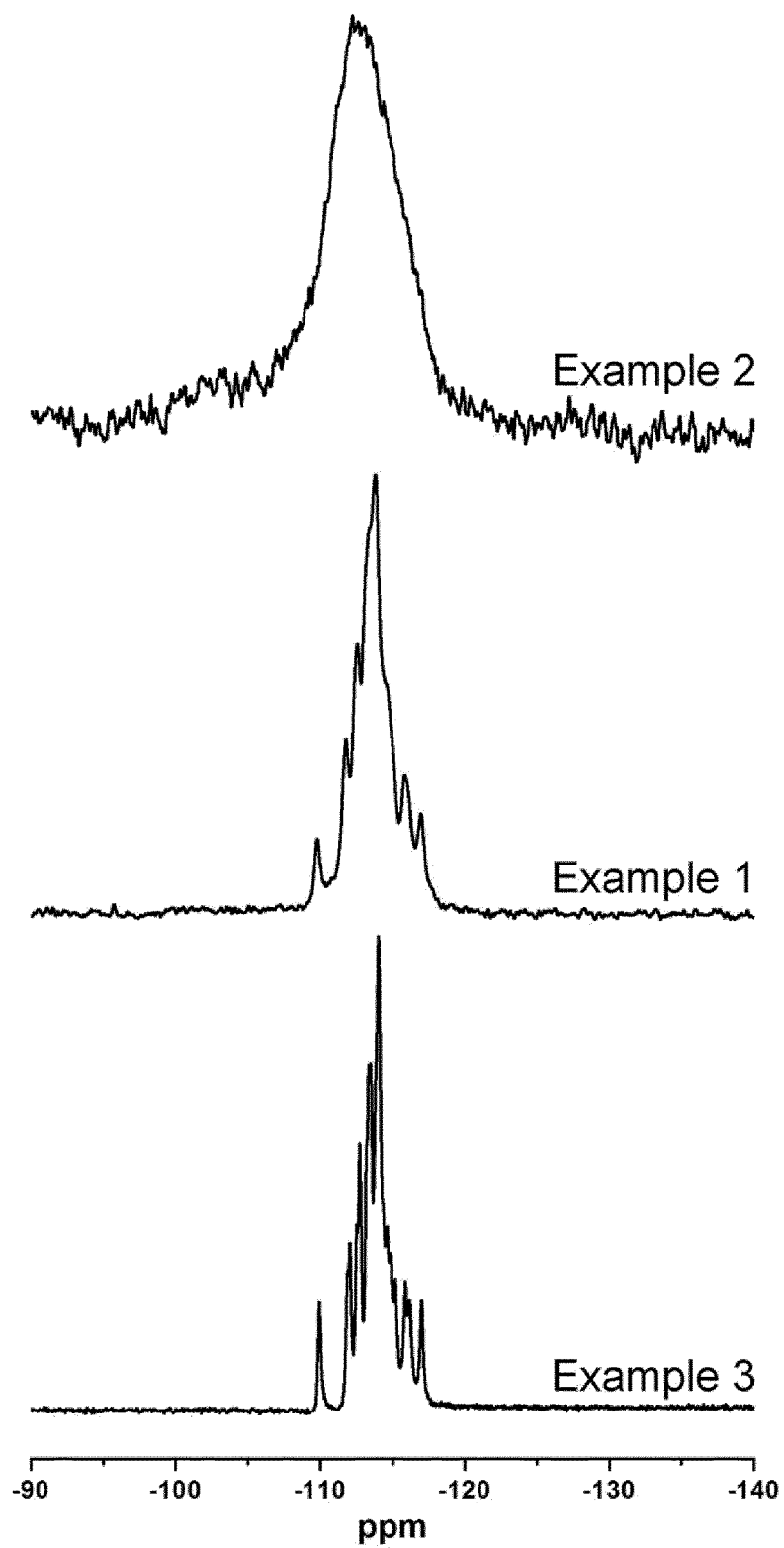
FIG. 4. $^{29}$Si MAS-NMR spectra of the silicalite-1 crystals synthesized according to Examples 1-3.

There is also provided herein, a crystal characterized in providing one or more narrow $Q^{(4)}$ resonance lines emanating from the crystallographically different Si-atoms at about −110 to −117 ppm in the $^{29}$Si MAS-NMR spectrum with sodium 3-(trimethylsilyl)-2,2,3,3-teradeuteriopropionate as standard, as illustrated for example in FIG. 4 b. However, when the crystals also contain aluminium in addition to silicon, the $Q^{(4)}$ resonance lines will broaden even if the crystals are still defect free. Said crystal is produced by a method as disclosed herein, meaning that said crystal may be equal to or less than about 1.5 µm such as equal to or less than about 1000, 500, 400, 300, 200, 100 or 50 nm in length.

Further, there is provided herein a film comprising zeolite and/or zeolite-like crystals as defined herein. There is also provided an object comprising zeolite and/or zeolite-like crystals as obtained by a method presented herein or as defined by any structural characteristics defined herein. Further, there is provided herein a membrane comprising zeolite and/or zeolite-like crystals as defined herein, and/or wherein said object which comprises zeolite and/or zeolite-like crystals is a membrane. Hence, an object as mentioned herein may be selected from one or more of the following: catalyst, ion exchanger, adsorbent, film, sensor and membrane, but is not limited thereto.

There is also provided the use of a zeolite and/or zeolite-like crystal as defined herein as a catalyst, ion exchanger, adsorbent, film, sensor and membrane, but is not limited thereto.

A zeolite and/or zeolite-like crystal may also be referred to herein as a molecular sieve crystal. Such a crystal may be used directly as for example a catalyst, ion exchanger, adsorbent, film, sensor and/or membrane, or it may be used in the manufacture of such an object, whichever is considered suitable for the present purpose. Encompassed herein is any object, structure, article or the like which comprises a zeolite and/or zeolite crystal produced by a method as disclosed herein. The object, structure or article may be or form part of a membrane.

There is also provided herein, a method for preparing a monolayer and/or multilayer structure comprising zeolite and/or zeolite-like crystals which method comprises:
a) preparing a dispersion comprising zeolite and/or zeolite-like crystal as defined herein, b) contacting a substrate with the dispersion such that zeolite and/or zeolite-like crystals adhere to the substrate, and c) forming a monolayer or multilayer of zeolite and/or zeolite-like crystals on said substrate. Such zeolite and/or zeolite crystals which are used for preparing a monolayer and/or multilayer structure are produced by a method as provided and disclosed herein, using any aspects thereof as provided herein.

There is also provided herein, a method for preparing a structure comprising zeolite and/or zeolite-like crystals, which method comprises:
a) providing a substrate with a monolayer or multilayer structure, said layer comprising zeolite and/or zeolite-like crystals as defined herein, b) forming a zeolite and/or zeolite-like crystal synthesis solution, and c) contacting (a) and (b) and growing said zeolite and/or zeolite-like crystals on said substrate. Such zeolite and/or zeolite crystals which are used for preparing a structure comprising zeolite and/or zeolite-like crystals are produced by a method as provided and disclosed herein, using any aspects thereof as provided herein. An example of such a structure is a film.

Accordingly, any method well known in the art may be used for preparing a monolayer or multilayer structure or a structure comprising zeolite and/or zeolite-like crystals from the crystals prepared according to a method as disclosed herein.

Examples of substrates that may be coated with zeolite and/or zeolite-like crystal films prepared as described herein, in order to be used in the field of sensor technology include solid silicon wafers, quartz, aluminium oxide, germanium, diamond, zinc sulphide, zinc selenide, aluminium silicate and precious metals. Porous alumina, silica, aluminium silicate, sintered metal and polymer substrates are examples of materials that may be used for preparing membranes for separation processes and, to a certain extent, catalytic membranes. Within the electrochemistry and electronics application fields, glass, metal and alloy substrates are of prime interest. Examples of fibrous materials that may be coated according to the procedures described herein include glass fibers, ceramic fibers, carbon fibers, graphite fibers, cellulose fibers and various polymer fibers.

Further modifications of the invention within the scope of the claims would be apparent to a skilled person. It will therefore be appreciated that the invention is not limited by the embodiments described above, and further modifications of the invention within the scope of the claims would be apparent to a skilled person.

Further Aspects

In a further aspect there is provided herein a method for producing zeolite and/or zeolite-like crystals which comprises the following steps: a) preparing an aqueous first reaction mixture comprising: i. one or more starting material (s) for preparing zeolites and/or zeolite-like crystals, and ii. a structure-directing agent, b) removing substantially all or most of any solubility-reducing component(s) formed in said first reaction mixture in step a), c) optionally adding one or more aqueous solvent(s) to the first reaction mixture thereby obtaining a second reaction mixture, d) forming zeolite and/or zeolite-like crystals from the first and/or the second reaction mixture, and e) recovering the formed zeolite and/or zeolite-like crystals from step d), wherein one or more composition(s) comprising one or more fluorine-containing compound(s) is/are added to the first reaction mixture and/or to the second reaction mixture.

The invention is exemplified and illustrated by the following experimental section, but is not intended to be limited thereto.

EXPERIMENTAL SECTION

Introduction

The discussion below summarize the difference between silicalite-1 crystals synthesized by a method as disclosed herein according to Example 1 with silicalite-1 crystals synthesized utilizing $OH^-$ as mineralizer according to Example 2.

The crystals synthesized by a method as disclosed herein are far more hydrophobic than crystals synthesized utilizing $OH^-$ as mineralizer. As an illustration of the hydrophobic character of the crystalline product, a sample of the crystals was contacted with saturated water vapour at room temperature for 3 days to be sure that the sample was completely saturated. Thereafter the crystals were placed in equipment for thermo-gravimetry (TG) and subjected to temperature programmed desorption experiments. After desorption from room temperature to 200° C. using a heating rate of 5° C. per minute, the sample had lost 1.15 wt. percent of its original weight.

A sample containing crystals synthesized using the $OH^-$ route with $OH^-$ as mineralizing agent was treated by the same procedure resulting in a weight loss of 5.24 wt. pct. implying that the present crystalline product prepared according to Example 1 is much more hydrophobic.

Furthermore, the surface area of the crystals formed after adding fluoride to the synthesis mixture is (349.7±5.0) $m^2/g$ as compared to (614.5±6.8 $m^2/g$) obtained for the crystals synthesized with $OH^-$ as mineralizing agent. The surface area was determined from nitrogen adsorption data according to the Brunauer, Emmet, and Teller [J. Am. Chem. Soc., 60 (1938), 309] method. In addition, the micropore volume of the two samples determined using the t-plot method, well-known in the art, was 0.18 and 0.14 $cm^3/g$ for the sample prepared using $OH^-$ and the sample using $F^-$, respectively. The much higher surface area and micropore volume of the crystals prepared using $OH^-$ as mineralizing agent indicate that these crystals have much more defects and thereby more silanol groups, and consequently are much more hydrophilic than the crystals prepared using $F^-$ as mineralizing agent.

As a further illustration of the hydrophobic character of the zeolite crystals synthesized as shown herein, samples of equal weight were saturated with an organic substance (ethanol) having a hydrophobic tail ($CH_3CH_2-$) and a hydrophilic head group ($-OH$). The polarity of ethanol as described by its dielectric constant is 24.30 and the dielectric constant of $H_2O$ is 79.99 [T. C. Bowen et al., J. Membrane Sci., 225 (2003) 165-176]. The lower polarity of ethanol should facilitate the adsorption of ethanol in a more hydrophobic environment such as the micro pores of the crystals synthesized by the fluoride route. The same adsorption and desorption procedure as described herein above shows that the molar ratio ethanol/water is 1.04 for the zeolite prepared in the presence of fluoride ions, while a much lower ratio, 0.29, is observed for the zeolite prepared in the presence of $OH^-$ ions, which shows that the zeolite prepared in the presence of fluoride ions is more hydrophobic than the sample prepared in the presence of $OH^-$ ions. A similar trend is observed for n-butanol/water ratios, i.e. a higher ratio is observed for the zeolite prepared in the presence of fluoride ions, which again shows that the zeolite prepared in the presence of fluoride ions is much more hydrophobic than the sample prepared in the presence of $OH^-$ ions.

The framework type was determined by means of powder X-ray diffraction (XRD) in Bragg Brentano geometry using $CuK_\alpha$ radiation with a Siemens D 5000 diffractometer.

$^{29}Si$ MAS-NMR spectra were recorded at 71.50 MHz using an Agilent/Varian/20 Chemagnetics InfinityPlus CMX-360 NMR spectrometer. The samples (ca 50-100 mg) were spun at 4.5 kHz in a zirconia rotor of 7.5 mm outer diameter. 2500-8000 signal transients were accumulated for each spectrum using sodium 3-(trimethylsilyl)-2,2,3,3-tera-deuteriopropionate as standard.

Nitrogen adsorption data at liquid nitrogen temperature was recorded using a Micromeritics ASAP 2010 instrument. The samples were degassed during 12 hours prior to analysis. Specific surface area was determined from the data using BET method according to Brunauer, Emmet, and Teller (J. Am. Chem. Soc., 60 (1938), 309). Micropore volume was determined from the data using the t-plot method.

Particle size and particle size distribution was determined using a Malvern Zetasizer-nz instrument. With a narrow particle size distribution referred to in this invention, a polydispersity index (PDI) less than 0.07, preferably less than 0.05 is intended. The mean size is calculated from the average signal intensity.

Particle size analysis was performed with electron microscopy using a FEI Magellan XHR SEM. The samples were not coated with any coating prior to analysis.

The hydrophobic properties of the samples were compared using temperature programmed desorption (TPD) admitting determination of the weight of adsorbed liquids having from hydrophilic to increasingly hydrophobic character. A TA Instruments TGA Q500 instrument operated at a heating rate of 5° C./min in air was used for the measurements.

EXAMPLES

Example 1

A synthesis mixture was prepared by first mixing tetraethoxysilane (TEOS, >98 wt-percent, Merck), tetrapropylammonium hydroxide (TPAOH, 40 wt-percent, Sigma), and distilled water. After stirring for 24 h, a fully hydrolyzed clear synthesis solution was obtained and the weight of the solution was recorded. Subsequently, some of the water and most of the ethanol were removed from the solution using a rotary evaporator operated at 323 K under reduced pressure for 1 h, after which a thick clear gel was obtained and the weight of the gel was recorded. Under these conditions, the temperature of the boiling synthesis mixture will be lower than 323 K. A certain amount of distilled water was added to the gel under stirring and a clear solution was obtained again. Thereafter, hydrofluoric acid (38-40 wt-percent, Merck) was added to the synthesis mixture under stirring and after about 10 s, a very viscous clear gel formed. The amount of HF added was equimolar to the amount of TPAOH in the solution, so that the pH of the very viscous gel became about 6.3. Under the assumption that all ethanol was removed from the solution, the resulting molar composition of the very viscous clear gel was: 25 $SiO_2$, 9 TPAF, and 300 H$_2$O. However, the gel contains small amounts of ethanol. The resulting very viscous gel was transferred to a polypropylene bottle and kept at 333 K for 2 months. During this time, the very viscous clear gel transformed to a pourable dispersion. After hydrothermal treatment, the crystals were purified by repeated centrifugation at about 50 000 g for 4 h. After each centrifugation, the supernatant was removed and the crystals were dispersed in distilled water. This procedure was repeated 4 times. Finally, the crystals were calcined in air at 773 K for 8 h.

Example 2

A synthesis mixture was prepared by first mixing tetraethoxysilane (TEOS, >98 wt-percent, Merck), tetrapropylammonium hydroxide (TPAOH, 40 wt-percent, Sigma) and distilled water. After stirring for 24 h, a fully hydrolyzed clear synthesis solution was obtained with the molar composition: 25 SiO$_2$, 9 TPAOH, 200 H$_2$O, and 100 Ethanol. The clear synthesis solution was then transferred into a polypropylene bottle, and kept at 333 K for 2 months. After hydrothermal treatment, the crystals were purified by repeated centrifugation using the same procedure as described in Example 1. Finally, the crystals were calcined at 773 K in air for 8 h.

Example 3

A synthesis mixture was prepared by first mixing tetraethoxysilane (TEOS, >98 wt-percent, Merck), tetrapropylammonium hydroxide (TPAOH, 40 wt-percent, Sigma), and distilled water. After stirring for 24 h, a fully hydrolyzed clear synthesis solution was obtained and the weight of the solution was recorded. Thereafter, hydrofluoric acid (38-40 wt-percent, Merck) was added to the synthesis mixture under stirring and after about 10 s, a very viscous clear gel formed. The amount of HF added was equimolar to the amount of TPAOH in the solution. The molar composition of the very viscous gel was: 25 SiO$_2$, 9 TPAF, 200 H$_2$O, and 100 Ethanol. The resulting very viscous clear gel was transferred to a polypropylene bottle and kept at 333 K for 2 months. During this time, the very viscous clear gel transformed to a pourable dispersion. After hydrothermal treatment, the crystals were purified by centrifugation as described in Example 1 and finally calcined at 773 K for 8 h.

Example 4

A Siemens D 5000 X-ray diffractometer (XRD) using CuK$_\alpha$ radiation and operated in Bragg Brentano geometry was used to determine the crystalline phase of the synthesized products. The step size of the goniometer was 0.01° with a count time per step of 80 seconds. The 2 θ angle was varied between 0 and 50°. The XRD patterns (FIG. 1) show that the crystalline framework of the products in Examples 1, 2, and 3 all are comprised of the MFI phase.

Example 5

Figure 2:
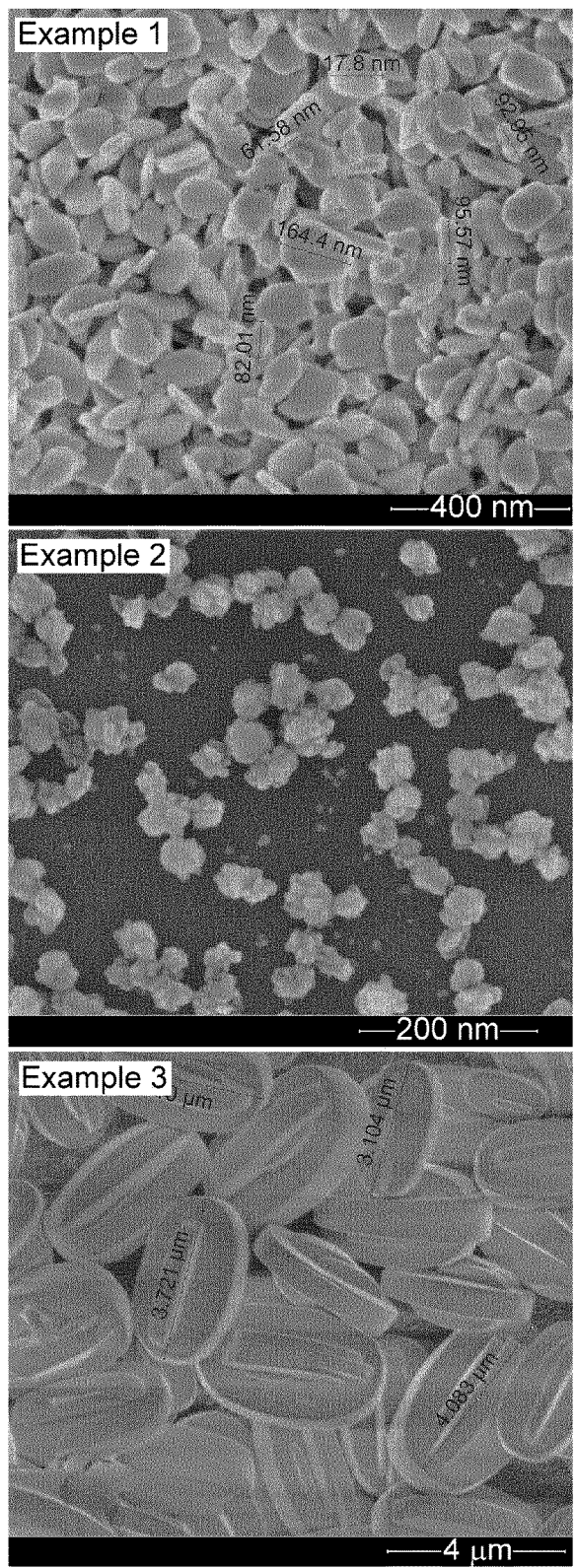
FIG. 2. SEM images of the silicalite-1 crystals synthesized according to the procedure described in Examples 1-3.

Scanning electron microscopy (SEM) images were recorded with a FEI Magellan 400 field emission SEM. The samples were not coated before analysis. As shown in FIG. 2, crystals prepared as described in Example 1 are uniform and discrete and no aggregation can be observed. The length of the crystals is less than 170 nm. The crystals are plate-like with an aspect ratio (length/width) of about 1.2 and the thickness of the crystals is less than 40 nm. In contrast, crystals prepared as described in Example 2 are all ball-shaped crystals with a diameter of about 50 nm (FIG. 2) and large crystals with a length of about 4 μm are formed when using the procedure described in Example 3 (FIG. 2).

Example 6

Figure 3:
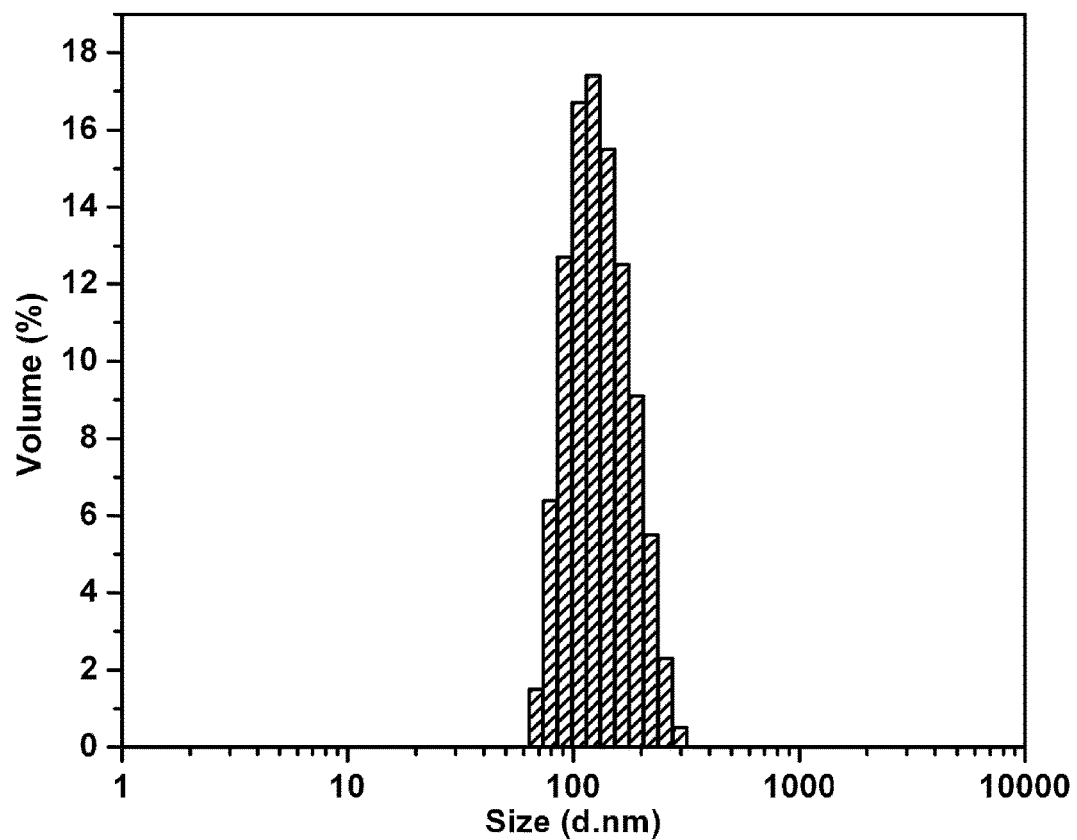
FIG. 3. DLS size distribution of silicalite-1 crystals synthesized according to Example 1.

The size distribution of the crystals synthesized according to Example 1 was determined by dynamic light scattering (DLS). The average diameter of the crystals is about 136 nm and the polydispersity index is 0.061, indicating a monomodal crystal size distribution (FIG. 3).

Example 7

$^{29}$Si MAS-NMR spectra were recorded of the crystals prepared according to Examples 1-3.

FIG. 4 show $^{29}$Si MAS-NMR spectra of silicalite-1 crystals prepared according to Examples 1 and 3 using fluoride as mineralizing agent. These spectra display sharp (linewidth≈0.5 ppm) completely or partially resolved resonance lines assigned to the crystallographically distinct silicon sites in MFI framework. The spectrum of the silicalite-1 crystals prepared using hydroxide as mineralizing agent, i.e. the product synthesized according to Example 2, shows a broad featureless resonance line centred at −110 to −117 ppm corresponding to silicon Q$^{(4)}$ sites (FIG. 4). The narrow, partially resolved resonance lines observed in the spectra recorded for the crystals prepared using fluoride as mineralising agent shows that the framework structure is well ordered and that the amount of defects, i.e. broken Si—O—Si bonds, is very low in these samples. On the contrary, the broad resonance line corresponding to silicon Q$^{(4)}$ sites observed in the spectrum recorded for the crystals prepared using hydroxide as mineralizing agent, indicates that this framework is less well ordered and more defective, with local distortions in the immediate vicinity of the silicon sites (L. A. Villaescusa, I. Diaz, P. A. Barrett, et al., Chem. Mater., 19 (2007): 1601-1621.).

Example 8

Figure 5:
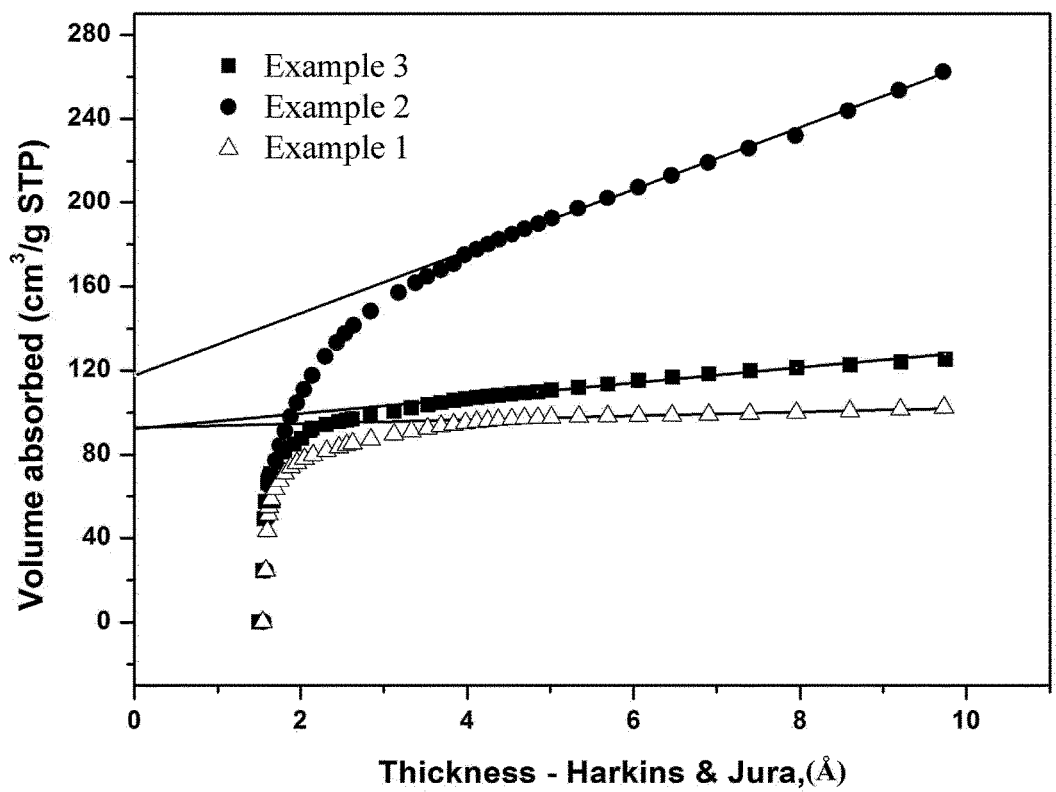
FIG. 5. t-plots of the silicalite-1 crystals synthesized according to Examples 1-3.

FIG. 5 shows t-plots from nitrogen adsorption data of the silicalite-1 crystals prepared as described in Examples 1-3. The micropore volume of the samples can be estimated from the intercept with the y-axis as indicated in the Figure. The crystals prepared using fluoride as mineralising agent (Examples 1 and 3) display much lower micropore volumes (about 0.14 cm$^3$/g) than the crystals prepared as described in Example 2 using hydroxide as mineralising agent (about 0.18 cm$^3$/g). This indicates that the crystals in the former two samples prepared using fluoride as mineralising agent have much less defects in the form of micropores in the crystals, compared to the latter sample prepared using hydroxide as mineralising agent.

Example 9

Water, ethanol (VWR 99.9%), and n-butanol (Sigma, 99%) were used as adsorbates in TPD experiments. Trace amounts of water in the alcohol was removed using dry zeolite pellets prior to the experiment. Before the TPD test, the silicalite-1 samples were calcined at 500° C. for 8 h and then placed in a desiccator saturated with the actual molecules for 48 h at 25° C. The desorption of the adsorbate was started at room temperature (25° C.) and monitored up to 200° C. at atmospheric pressure and with a heating rate of 5° C./min.

The weight loss of the absorbents in the temperature interval 25° C. to 200° C. is shown in Table 1. The molar alcohol/water ratios of adsorbates desorbed from crystals synthesized according to Example 1 prepared using fluoride as mineralizing agent are higher than those synthesized according to Example 2 prepared using hydroxide as mineralizing agent, which indicates that the silicalite-1 crystals synthesized using fluoride as mineralizing are much more nonpolar than the silicalite-1 crystals synthesized with hydroxide as mineralizer. These results clearly indicate that the hydrohobicity of the crystals sythesized as described in Example 1 is much higher than the hydrophobicity of the product synthesized according to Example 2.

Example 10

A synthesis mixture was also prepared by first mixing colloidal silica (30 wt-percent silica, Bindzil 30/220 from Eka Chemicals AB) and tetrapropylammonium hydroxide (TPAOH, 40 wt-percent, Sigma). A small amount of water was removed from the mixture using a rotary evaporator operated at 323 K under reduced pressure for about 10 minutes. Under these conditions, the temperature of the boiling synthesis mixture will be lower than 323 K. After stirring for 24 h, hydrofluoric acid (38-40 wt-percent, Merck) was added to the synthesis mixture under stirring and a very viscous clear gel formed. The amount of HF added was equimolar to the amount of TPAOH in the solution. The resulting molar ratio of the very viscous clear gel was: 25 $SiO_2$, 0.4$Na_2O$, 9 TPAF, and 300 $H_2O$. The obtained gel was transferred to a polypropylene bottle and kept at 333 K for 2 months. After hydrothermal treatment, the product was purified by repeated centrifugation and dispersion in distilled water as described in example 1. Finally, the product was calcined at 773 K for 8 h. Characterization by XRD showed that the product was amorphous and no MFI phase was detected.

Example 11

A synthesis mixture was also prepared by first mixing colloidal silica (30 wt-percent silica, Bindzil 30/220 from Eka Chemicals AB), tetrapropylammonium hydroxide (TPAOH, 40 wt-percent, Sigma). A small amount of water was removed from the mixture using a rotary evaporator operated at 323 K for about 10 minutes. Under these conditions, the temperature of the boiling synthesis mixture will be lower than 323 K. After stirring for 7 days, hydrofluoric acid (38-40 wt-percent, Merck) was added to the synthesis mixture under stirring and a very viscous clear gel formed. The amount of HF added was equimolar to the amount of TPAOH in the solution. The resulting molar ratio of the very viscous clear gel was: 25 $SiO_2$, 0.4$Na_2O$, 9 TPAF, and 300 $H_2O$. The resulting gel was transferred to a polypropylene bottle, and kept at 333 K for 2 months. After hydrothermal treatment, the product was purified by centrifugation as described above and finally calcined at 773 K for 8 h. The SEM image (FIG. 6a) showed that the obtained crystals have a length of about 1.5 μm. The XRD pattern (FIG. 6b) showed that the product was crystalline and exhibited MFI phase. The only difference between Example 10 and Example 11 is the stirring time.

Example 12

A synthesis mixtures was also prepared by first mixing fumed silica (99.8 wt-percent silica, Sigma), tetrapropylammonium hydroxide (TPAOH, >40 wt-percent, Sigma) and distilled water. After stirring for 24 h, hydrofluoric acid (38-40 wt-percent, Merck) was added to the synthesis mixture under stirring and a solid gel formed. The amount of HF added was equimolar to the amount of TPAOH in the solution. The resulting molar ratio of the very viscous clear gel was: 25 $SiO_2$, 9 TPAF, and 300 $H_2O$. The obtained gel was transferred to a polypropylene bottle and kept at 333 K for 2 months. After hydrothermal treatment, the product was purified by centrifugation as described above. Finally, the product was calcined at 773 K for 8 h. The SEM image (FIG. 7a) shows that large crystals with a length of about 11 μm were formed and XRD (FIG. 7b) showed that the crystals were of MFI phase.

Example 13

Figure 8:
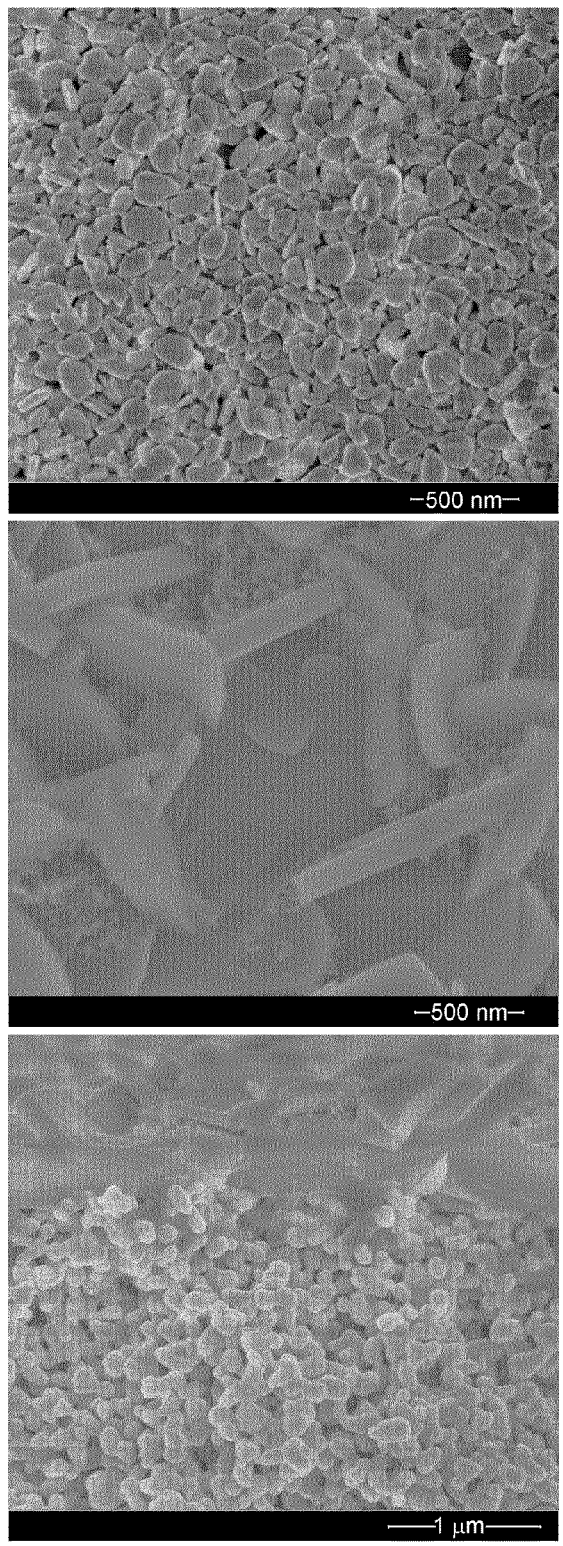
FIG. 8. SEM image of seed layer (top), of the membrane surface (center) and the membrane cross section (bottom) of the as synthesized membrane (Example 13) using seed crystals prepared according to Example 1

Porous alumina discs (Fraunhofer IKTS, Germany), consisting of a 30 μm thick top layer with 100 nm pores and a 3 mm thick base with 3 μm pores, were used as supports for preparation of membranes. The nanocrystals prepared in Example 1 were deposited on the support surface as a monolayer, see FIG. 8 (top), using the method described earlier [High-flux MFI membranes, Hedlund, J; Sterte, J; Anthonis, M; et al., MICROPOROUS AND MESOPOROUS MATERIALS, Volume: 52 Issue: 3 Pages: 179-189 May 2002]. However, the support was not masked prior to deposition of the monolayer. The synthesis mixtures for membrane growth were prepared by mixing tetraethoxysilane (TEOS, >98%, Merk), tetrapropylammonium hydroxide (TPAOH, 40%, Sigma) and distilled water. After complete hydrolyzation, hydrofluoric acid (38-40 wt. %, Merck) was added to the synthesis mixtures under stirring, and a gel formed. The amount of HF added was equimolar to the amount of TPAOH in the solution and the pH of the gel became about 6.8. The molar composition of the gel was: 25 $SiO_2$: 9 TPAF: 1991 $H_2O$:100 Ethanol. The seeded support was hydrothermally treated in the gel at 100° C., a method well-known in the art. The hydrothermal treatment time was 72 h, after which a continuous film had formed on the surface of the support. After synthesis, the membrane was rinsed for 1 day in a 0.1 M aqueous ammonia solution. Then, the membrane was calcined in air at 500° C. for 6 h using a heating rate of 0.2° C. $min^{-1}$ and a cooling rate of 0.3° C. $min^{-1}$. SEM images of the membrane surface showed that the membrane was composed of well interconnected crystals and no defects could be observed, see FIG. 8 (center). SEM images of the cross-section, see FIG. 8 (bottom) demonstrated that the TPAF-MFI membrane was continuous and the total thickness of the zeolite layer was about 600 nm.

Example 14

Figure 9:
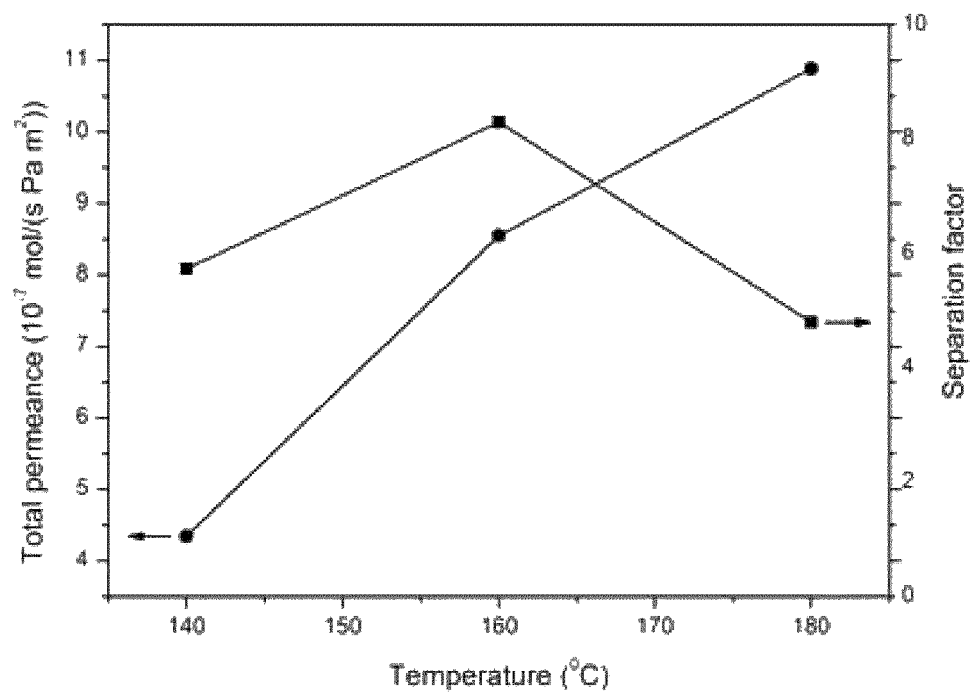
FIG. 9. Permeance and separation factor of an MFI membrane prepared according to Example 14.

Separation performance of the membranes prepared as described in example 13 was evaluated utilizing vapor permeation. The effective membrane area was 3.14 $cm^2$, and both sides of the membrane were sealed with graphite gaskets. The feed was a mixture of 5 kPa n-butanol, 5 kPa water, and 91 kPa helium. Helium (101 kPa) was used as sweep gas. The separation was carried out at temperatures of 140° C., 160° C., and 180° C. Permeate and feed concentrations were measured using a gas chromatograph (Varian Chrompack CP-3800) connected online. The separation factor was determined as $\alpha_{n\text{-}butanol/water} = (Y_{n\text{-}butanol}/Y_{water})/(X_{n\text{-}butanol}/X_{water})$, where Y and $X_1$ denote the mole fraction of n-butanol and water in the permeate and feed streams, respectively. FIG. 9 shows the separation performances of the as-synthesized membranes. In this temperature range, the total permeance of the membrane increased with the separation temperature and was about $8.5 \times 10^{-7}$ mol s$^{-1}$ m$^{-2}$ Pa$^{-1}$ at 160° C. The membrane was butanol selective and the separation factor at this temperature was about 8.3.

Example 15

Figure 10:
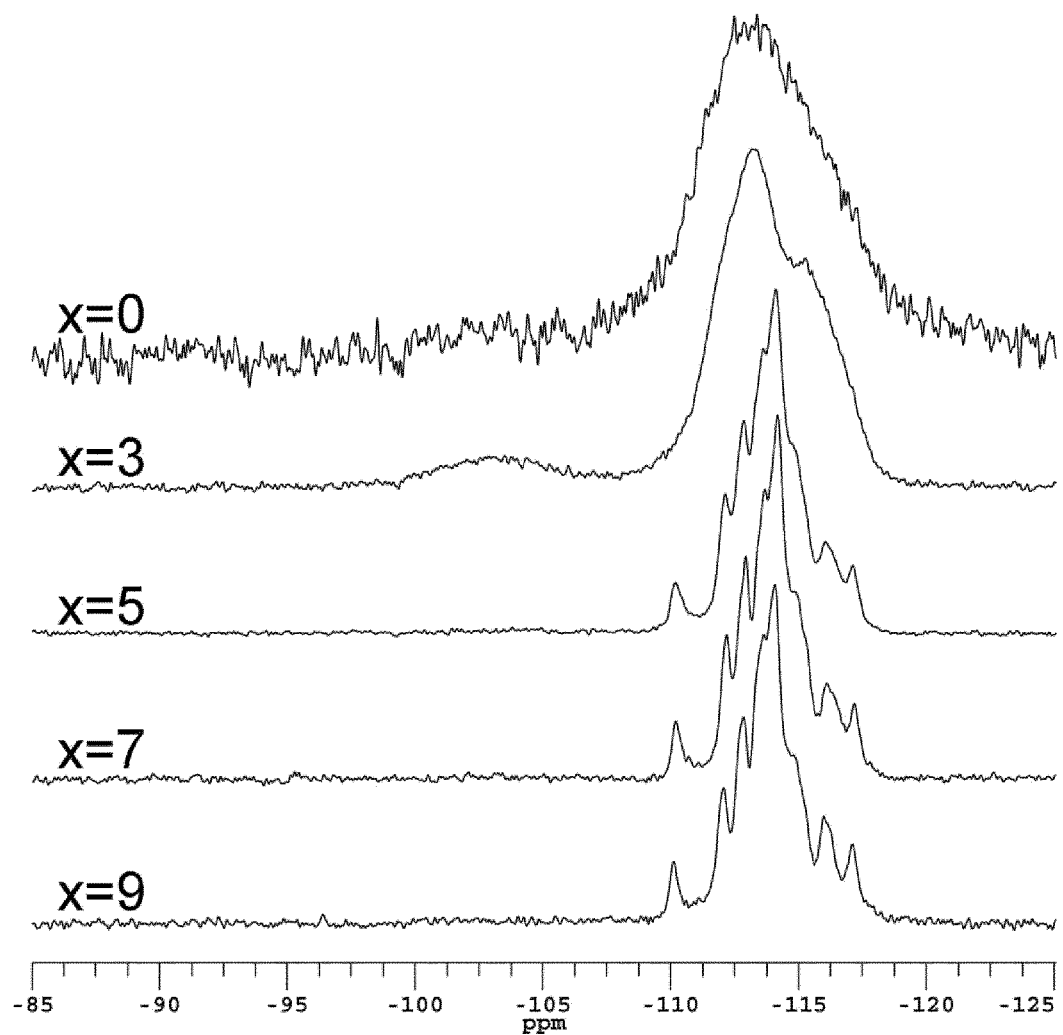
FIG. 10. $^{29}$Si MAS-NMR spectra of the silicalite-1 crystals prepared according to Example 15.

Silicalite-1 crystals were prepared as described in Example 1, with the only difference that the amount of HF added to the synthesis mixture was varied. The molar composition of the resulting clear solution/gels were 25 SiO$_2$, x TPAF, (9-x) TPAOH, 300 H$_2$O and x was 0, 3, 5, 7 and 9, respectively. An x value of 9 corresponds to Example 1 and an x value of 0 corresponds to Example 2. In all cases when HF was added to the clear solution, a viscous clear gel was obtained as in Example 1, and when no HF was added, a clear synthesis solution was obtained as in Example 2. The pH value of the resulting synthesis mixtures was measured to about 11.8, 8.8, 6.5, 6.2 and 6.3, for x values of 0, 3, 5, 7 and 9, respectively. XRD showed that all crystals were comprised of pure MFI framework and phase. FIG. 10 shows the $^{29}$Si MAS-NMR spectra of the silicalite-1 crystals. The partially resolved Q$^{(4)}$ resonance lines observed in the spectra recorded for the crystals prepared with x>3, i.e. when the fluoride/water molar ratios is 1.7% or more, i.e. using only fluoride or a combination of fluoride and hydroxide as mineralising agent, shows that the framework structure is well ordered and that the amount of defects, i.e. broken Si—O—Si bonds, is very low in these crystals. On the contrary, the broad resonance line corresponding to silicon Q$^{(4)}$ sites observed in the spectra recorded for the crystals prepared using x=3 and a low amount of fluoride or only hydroxide as mineralizing agent (x=0), indicates that these frameworks are less well ordered and defective. Furthermore, this example shows that well-ordered MFI framework structures are obtained when the pH of the very viscous gel is in the range of about 6-8.

Example 16

A synthesis mixture was prepared by first mixing tetraethoxysilane (TEOS, >98 wt-percent, Merck), tetrapropylammonium hydroxide (TPAOH, 40 wt-percent, Sigma), and distilled water. The weight of the synthesis mixture was 118.44 gram. After stirring for 6 h at room temperature (~295 K), to evaporate ethanol formed by hydrolysis, the weight had reduced to 116.53 gram. Accordingly, 1.91 gram of water and ethanol had evaporated. Assuming the total amount of evaporated ethanol to be 1.91 gram, the weight-loss of ethanol was less than 1.7% by weight implying that about 38% by weight ethanol remained in the mixture.

In a parallel experiment a synthesis mixture prepared as above was treated in a rotary evaporator operated at 323 K under reduced pressure for 1 h. The amount of ethanol remaining in the synthesis mixture was measured by High Pressure Liquid Chromatography to be 0.66% by weight.

Example 17

A synthesis mixture was prepared by first mixing 1.0 mol tetraethoxysilane (TEOS, >98 wt-percent, Merck), 0.36 mol tetrapropylammonium hydroxide (TPAOH, 40 wt-percent, Sigma), 11.64 mol distilled water, and 0.033 mol Aluminiumisopropoxide. After shaking for 24 h, a fully hydrolyzed and clear synthesis mixture was obtained and the weight of the mixture was recorded. Subsequently, some of the water and most of the ethanol were removed from the solution using a rotary evaporator operated at 323 K under reduced pressure for 1 h, after which a solid mixture was obtained and the weight of the mixture was recorded. Under these conditions, the temperature of the boiling synthesis mixture will be lower than 323 K. A certain amount of distilled water (23.55 gram) was then added to the solid mixture. Subsequently, 0.36 mol of hydrofluoric acid (38-40% by weight, Merck) was added to the synthesis mixture under stirring and a very viscous clear gel formed. The amount of HF added was equimolar to the amount of TPAOH in the mixture, so that the pH of the very viscous gel became about 6. However, the gel contained small amounts of ethanol. The resulting very viscous gel was transferred to a polypropylene bottle and kept in a reflux oil bath at 373 K for 4 weeks. After hydrothermal treatment, the crystals were purified by repeated centrifugation at about 10 000 rpm for 10 minutes. After each centrifugation, the supernatant was removed and the crystals were dispersed in distilled water. This procedure was repeated 4 times. Finally, the crystals were calcined in air at 773 K for 8 h. The SEM image showed that the obtained ZSM-5 crystals had a length of about 0.7 μm Tables

TABLE 1

Comparison of adsorption/desorption properties between silicalite-1 crystals prepared according to Example 1 and silicalite-1 crystals prepared according to Example 2.

| | silicalite-1 (example 1) | | silicalite-1 (example 2) | |
|---|---|---|---|---|
| Guest molecule | *Δm (g/g) × 10$^{-2}$ | Alcohol/water (molar ratio) | *Δm (g/g) × 10$^{-2}$ | Alcohol/water (molar ratio) |
| Water | 1.26 | | 6.12 | |
| Ethanol | 3.35 | 1.04 | 4.48 | 0.29 |
| n-butanol | 7.7 | 1.49 | 30.4 | 1.21 |

*Δm is the desorbed mass of guest molecules (weight loss) per mass of silicalite-1 crystals.

REFERENCES

1. Database of Zeolite Structures: http://www.iza-structure.org/
2. Ch. Baerlocher, L. B. Mc Cusker, D. H. Olson. Atlas of Zeolite Framework Types, 6$^{th}$ Ed., 2007, Elsevier, ISBN 978-0-444-53064-6.
3. Flanigen and Patton: U.S. Pat. No. 4,073,865 (1978).
4. U.S. Pat. No. 4,061,724 (1977).
5. T. Kida et al., Ceramics International 30 (2004) 727-732.
6. Benoit Louis and Lioubov Kiwi-Minsker (Micropor. Mesopor. Mater. 74 (2004) 171-178.
7. R. Mostowicz et al. (Zeolites 13 (1993) 678-684.
8. J. Patarin et al. (Zeolites 10 (1990) 674-679.
9. M. Veltri et al. (Micropor. Mesopor. Mater. 420 (2004) 145-154.
10. Otterstedt, Sterte, Schoeman. U.S. Pat. No. 5,863,516 (A).
11. Lubomira Tosheva and Valentin P. Valtchev, Chem. Mater. 2005, 17, 2494-2513.
12. J. D. Sherman. Proc Natl Acad Sci USA. 2000 May 23; 97(11); 6236.13. Brunauer, Emmet, and Teller, J. Am. Chem. Soc., 60 (1938), 309.
14. T. C. Bowen et al., J. Membrane Sci., 225 (2003) 165-176.
15. L. A. Villaescusa, I. Diaz, P. A. Barrett, et al., Chem. Mater., 19 (2007): 1601-1621.

16. H. Koller, A. Wölker, L. A. Villaescusa, M. J. Diaz-Cabañas, S. Valencia, and M. A. Camblor, J. Am. Chem. Soc. 121 (1999) 3368-3376.
17. J. Hedlund, J. Sterte, M. Anthonis, et al., Microporous and Mesoporous Materials, 52 (2002) 179-189.
18. Kresten Egeblad et al., Microporous and Mesoporous Materials 101 (2007) 214-223.
19. Yanli Chen et al., Microporous and Mesoporous Materials 124 (2009) 8-14.

The invention claimed is:

1. A method for producing MFI zeolite crystals, wherein said method comprises the following steps:
   a) mixing
      i) one or more tetraalkoxysilane(s) and/or one or more aluminiumalkoxide(s),
      ii) tetraalkylammoniumhydroxide, and
      iii) water,
      thereby providing a mixture comprising
      i) one or more hydrolyzed tetraalkoxysilane(s) and/or one or more hydrolysed aluminiumalkoxide(s),
      ii) tetraalkylammoniumhydroxide,
      iii) water, and
      iv) one or more alcohol(s),
   b) removing said alcohol(s) formed in step a) so that the mixture contains 10 wt % or less of said alcohol(s),
   d) (i) adding a fluorine containing compound to the mixture, said fluorine containing compound being selected from the group consisting of tetraalkylammonium fluoride, ammonium fluoride, potassium fluoride, sodium fluoride, and hydrofluoric acid, or a combination thereof, and (ii) adjusting the pH of the composition to which the fluorine containing compound has been added to a pH of 6-8,
   e) forming MFI zeolite crystals from the mixture using hydrothermal treatment in a temperature range from 30° C. to 100° C., and
   f) collecting the MFI zeolite crystals from step e), wherein the MFI zeolite crystals have a length of 1.5 μm or less.

2. The method according to claim 1, further comprising a step c) prior to step d) and following step b):
   c) adding one or more aqueous solvent(s) to the mixture containing 10 wt % or less of said alcohol(s).

3. The method according to claim 2, wherein said fluorine containing compound is added in step a), b) or c).

4. The method according to claim 1, wherein step e) takes place by maintaining the mixture at a temperature in range from 50° C. to 70° C.

5. The method according to claim 1, wherein said tetraalkoxysilane is tetraethoxysilane.

6. The method according to claim 1, wherein said aluminium alkoxide is aluminium isopropoxide.

7. The method according to claim 1, wherein said alcohol(s) is ethanol and/or isopropanol.

8. The method according to claim 1, wherein said tetraalkylammonium hydroxide is tetrapropylammonium hydroxide.

9. The method according to claim 1, wherein step b) is performed by evaporation, distillation or adsorption.

10. The method according to claim 2, wherein the one or more aqueous solvent(s) is water.

11. The method according to claim 1, wherein the MFI zeolite crystals have a length of 1000 nm or less.

* * * * *